United States Patent
Ebrahimi Afrouzi

(10) Patent No.: US 11,975,455 B1
(45) Date of Patent: May 7, 2024

(54) METHOD AND SYSTEM FOR AUTOMATED ROBOTIC MOVEMENT

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

(*) Notice: Subject to any disclaimer, the term of this patent is extended or adjusted under 35 U.S.C. 154(b) by 227 days.

(21) Appl. No.: 17/702,580

(22) Filed: Mar. 23, 2022

Related U.S. Application Data

(63) Continuation of application No. 16/558,047, filed on Aug. 31, 2019, now abandoned, which is a continuation of application No. 15/676,888, filed on Aug. 14, 2017, now Pat. No. 10,442,082, which is a continuation of application No. 14/673,633, filed on Mar. 30, 2015, now Pat. No. 9,764,472.

(60) Provisional application No. 62/026,363, filed on Jul. 18, 2014.

(51) Int. Cl.
G05D 1/02 (2020.01)
B25J 9/16 (2006.01)
G05D 1/00 (2006.01)

(52) U.S. Cl.
CPC ......... *B25J 9/1666* (2013.01); *B25J 9/1605* (2013.01); *B25J 9/1664* (2013.01); *B25J 9/1694* (2013.01); *G05D 1/0219* (2013.01); *G05D 1/0238* (2013.01); *G05D 1/0242* (2013.01); *G05D 1/0251* (2013.01); *G05D 2201/0203* (2013.01); *G05D 2201/0215* (2013.01); *Y10S 901/01* (2013.01); *Y10S 901/09* (2013.01)

(58) Field of Classification Search
CPC ...... B25J 9/1666; B25J 9/1605; B25J 9/1664; B25J 9/1694; G05D 1/0219; G05D 1/0238; G05D 1/0242; G05D 1/0251; G05D 2201/0203; G05D 2201/0215; Y10S 901/01; Y10S 901/09
See application file for complete search history.

(56) References Cited

U.S. PATENT DOCUMENTS

| | | | |
|---|---|---|---|
| 8,463,438 B2 * | 6/2013 | Jones | G05D 1/0219 700/258 |
| 2006/0020369 A1 * | 1/2006 | Taylor | A47L 9/2852 318/568.12 |
| 2007/0016328 A1 * | 1/2007 | Ziegler | B60B 33/0039 701/23 |

* cited by examiner

Primary Examiner — Jason Holloway

(57) ABSTRACT

Provided is a method for determining a coverage path of a robotic device, including: capturing, with a sensor, spatial data of the environment; detecting, with a processor, at least one obstacle within the environment based on the spatial data; determining, with the processor, a first working zone within the environment; determining, with the processor, a coverage path within the first working zone that accounts for at least one of the obstacles detected within the first working zone; actuating, with the processor, a robotic device to drive along the coverage path within the first working zone; and wherein the processor determines an adapted coverage path when a new obstacle is detected and wherein the processor actuates the robotic device to drive along the adapted coverage path.

20 Claims, 23 Drawing Sheets

FIG. 3A
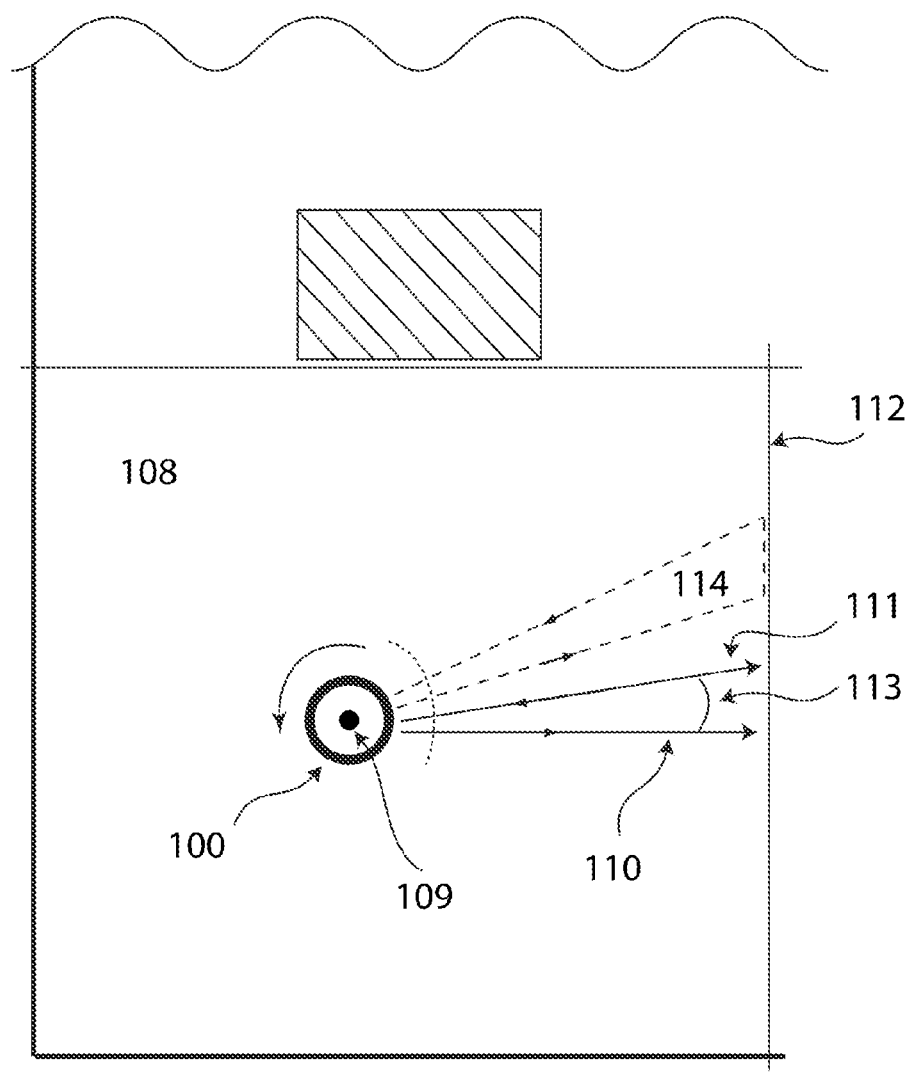
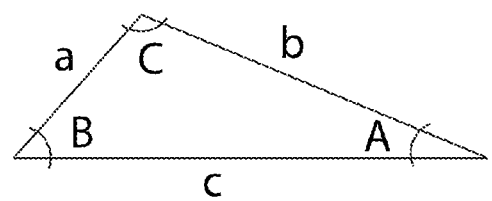
FIG. 3B

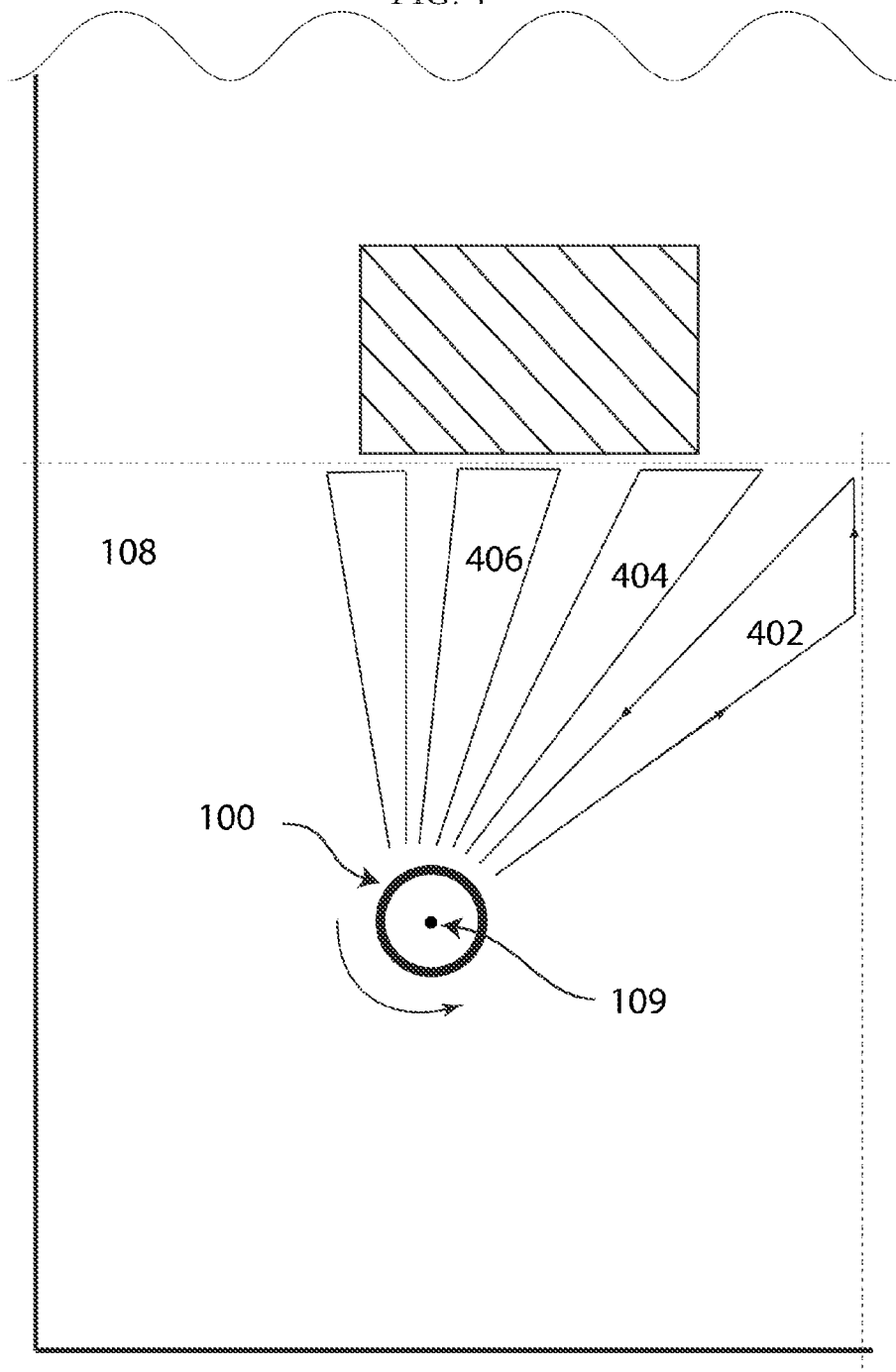

FIG. 19

For Brushes 9.5" – 10"

| If the first measured side of the triangle is at least ____ (meters) | But less than ____ (meters), | Then the turning angle shall be ____ (degrees). |
|---|---|---|
| 0 | .5 | 45 |
| .5 | 1 | 30 |
| 1 | 1.5 | 20 |
| 1.5 | 2 | 15 |
| 2 | 2.5 | 10 |
| 2.5 | - | 5 |

METHOD AND SYSTEM FOR AUTOMATED ROBOTIC MOVEMENT

CROSS-REFERENCE TO RELATED APPLICATIONS

This application is a Continuation of Non-Provisional patent application Ser. No. 16/558,047, filed Aug. 31, 2019, which is a Continuation of Non-Provisional patent application Ser. No. 15/676,888, filed Aug. 14, 2017, which is a Continuation of Non-Provisional patent application Ser. No. 14/673,633, filed Mar. 30, 2015, which claims the benefit of Provisional Patent Application No. 62/026,363, filed Jul. 18, 2014, each of which is hereby incorporated by reference.

FIELD OF INVENTION

The present invention generally relates to automated robotic path generation for moving a robotic device autonomously, and device and systems using the same.

BACKGROUND

It has always been a challenge with autonomous cleaning robots to ensure full coverage of a working area in a timely manner. Several efforts have been made to address this challenge, most of which are either too expensive or impractical for use in a typical consumer's daily application.

A cleaning robot's performance is measured by the amount of cleaning it does relative to the area that it visits in a given amount of time. If a cleaning robot relies purely on random movement, then its performance decreases relative to the amount of coverage as a function of time. In other words, efficiency (E) approaches zero when time (T) approaches infinity.

One way to optimize the robot's cleaning behavior is to equalize the cleaning rate with the coverage rate. To accomplish this, there is a need for a better method for the robotic device to keep continuous track of its own relative location in the workspace so that it can calculate and keep track of the paths that it has already cleaned. Different companies have worked on this matter in previous art, for example, the use of differential GPS, Ultrasonic transducers and scanning laser ranges. Each of the said technologies has its own limits and problems, such as expensive technology and complications of application.

Other solutions employ a navigation system that requires attaching large bar code targets at different positions in the workspace. In order to utilize the navigation system, however, the robot must see at least four of the bar codes simultaneously, which creates a significant operational problem.

Still other solutions utilize rotating laser rangefinders for localization and path determination. The use of rotating laser rangefinders on the robotic device has a few downsides, one of which is the mechanical nature of solution. Mechanical devices have a high tendency to break down and fail to function compared to fixed electronic devices. Another downside of this method is the price to employ the technology. Employing rotating laser rangefinders is a relatively expensive solution to the problem, considering that the overall result is not much better than employing random and simpler algorithms.

In solutions that use purely random navigation or random bouncing methods, focus has been on "sensing" the environment and making reactive decisions in response to the input from sensors. In previously proposed methods, the robot actively probed the environment and planned its movement accordingly. Although random methods are more practical and cheaper than the sophisticated technologies previously described, the robot's coverage is based on randomly selected paths, and the percentage of area cleaned and coverage rate are relative to the amount of time that the robotic device spends in the area. Robots using random movement patterns may not clean an acceptable percentage of the area during a finite time. Maximum cleaning efficiency is not achieved through random movement methods because there is too much unnecessary path overlap. An autonomous robot with a random movement method is unlikely to cover the entirety of an area in a finite amount of time.

As such, methods and systems for automated robotic movement with improved work-space coverage while balancing of finite operation time are provided herein.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

The present invention introduces a set of methods and movement patterns, and devices and systems using the same, to increase an autonomous robotic device's performance, and in particular its efficiency. This invention provides a set of cost-effective methods to aid an autonomous robotic device, such as a cleaning robotic device, in the navigation and cleaning of a workspace regardless of its size, shape and obstacles within the workspace at an improved cleaning-to-coverage rate. In an embodiment, the methods, apparatus and system comprise a set of movement patterns to minimize redundancy. As such, methods for automated robotic movement for a robotic device using an electronic computing device are disclosed, the methods including: causing the electronic computing device to establish a working zone; measuring distances to obstacles surrounding the device to select the appropriate movement pattern; detecting one or more obstacles in the working zone; establishing a coverage path that accounts for any detected obstacles; executing the coverage path; if a new obstacle is encountered on the established path, establishing an adapted coverage path that accounts for the new obstacle; executing the adapted coverage path; and repeating the process of detecting obstacles and establishing and executing paths until the device has covered all areas of the work zone at least once. In some embodiments, the method further includes: bypassing the new obstacle; and returning to the coverage path. In some embodiments, the causing of the electronic computing device to establish the working zone includes: finding an X boundary in an X direction of the working zone; finding a Y boundary in a Y direction of the working zone; and moving the robotic device to a center of the working zone. In some embodiments, the method further includes: moving the robotic device to a new location if the measured boundaries are less than a pre-determined minimum length.

As such, methods for automated robotic movement for a robotic device using an electronic computing device are presented, the methods including: causing the electronic computing device to establish a working zone; measuring distances to all obstacles in the working zone thereby detecting all obstacles in the working zone; establishing a coverage path that accounts for all detected obstacles; executing the coverage path such the robotic device covers the working zone at least once; if a new obstacle is detected, establishing an adapted coverage path that accounts for the new obstacle; and executing the adapted coverage path. In some embodiments, methods further include: bypassing the new obstacle; and returning to the coverage path. In some embodiments, causing the electronic computing device to establish the working zone includes: finding an X boundary in an X direction of the working zone; finding a Y boundary in a Y direction of the working zone; and moving the robotic device to a center of the working zone. In some embodiments, methods further include: moving the robotic device to a new location if the working zone established is less than a pre-determined minimum size. In some embodiments, finding the X boundary in the X direction of the working zone includes: establishing an $X_{max}$, where the $X_{max}$ corresponds with a maximum X distance in the X direction of the working zone; determining an $X_{pos}$ and an $X_{neg}$, where $X_{pos}$ corresponds with a first distance to a first nearest object in a first X direction, and where $X_{neg}$ corresponds with a second distance to a second nearest object in a second X direction; and calculating an $X_{axis}$, where $X_{axis}$ corresponds either with $X_{max}$ or with a distance defined by $X_{pos}$ and $X_{neg}$.

In some embodiments, finding the Y boundary in the Y direction of the working zone includes: establishing an $Y_{max}$, where the $Y_{max}$ corresponds with a maximum Y distance in the Y direction of the working zone; determining an $Y_{pos}$ and an $Y_{neg}$, where $Y_{pos}$ corresponds with a first distance to a first nearest object in a first Y direction, and where $Y_{neg}$ corresponds with a second distance to a second nearest object in a second Y direction; and calculating an $Y_{axis}$, where $Y_{axis}$ corresponds either with $Y_{max}$ or with a distance defined by $Y_{pos}$ and $Y_{neg}$. In some embodiments, moving the robotic device to the center of the working zone includes: moving the robotic device to $X_{center}$, where $X_{center}$ corresponds with a midpoint of $X_{axis}$; and moving the robotic device to $Y_{center}$, where $Y_{center}$ corresponds with a midpoint of $Y_{axis}$. In some embodiments, establishing the coverage path that accounts for all detected obstacles includes any of: calculating a first center-return path, where the first center-return path is defined by a number of substantially collision-free triangulated paths, and where the first center-return path corresponds with a maximum turning angle, a triangle measured size with respect to a tool size of the robotic device and distances to all detected obstacles; calculating a second center-return path, where the second center-return path is defined by a number of substantially collision-free isosceles triangulated paths, and where the second center-return path corresponds with a maximum turning angle, an isosceles triangle measured size with respect to the tool size of the robotic device and a distance to a first newly detected obstacle; and calculating a third center-return path, where the third center-return path is defined by a number of substantially collision-free point-to-point paths, and where the third center-return path corresponds with a maximum turning angle and a number of straight lines each having a measured size with respect to detected obstacles.

In some embodiments, establishing the adapted coverage path that accounts for the new obstacle includes any of: calculating a first center-return path, where the first center-return path is defined by a number of substantially collision-free triangulated paths, and where the first center-return path corresponds with a maximum turning angle, a triangle measured size with respect to a tool size of the robotic device and distances to all detected obstacles; calculating a second center-return path, where the second center-return path is defined by a number of substantially collision-free isosceles triangulated paths, and where the second center-return path corresponds with a maximum turning angle, an isosceles triangle measured size with respect to the tool size of the robotic device and a distance to a first newly detected obstacle; and calculating a third center-return path, where the third center-return path is defined by a number of substantially collision-free point-to-point paths, and where the third center-return path corresponds with a maximum turning angle and a number of straight lines each having a measured size with respect to detected obstacles. In some embodiments, detecting the new obstacle after execution of a planned path has begun causes an error to be logged, where when a first pre-determined number of errors are logged, switching from calculating the first center-return path to calculating the second center-return path, and where when a second pre-determined number of errors are logged, switching from calculating the second center-return path to calculating the third center-return path.

In some embodiments, executing the adapted coverage path further includes any of: moving the robotic device to the center of the working zone by retracing the coverage path before executing the adapted coverage path; moving the robotic device directly to the center of the working zone from the current location before executing the adapted coverage path; moving the robotic device directly to the third side of a triangular path from the current location before executing the adapted coverage path; and turning the robotic device a pre-set number of degrees, calculating a new triangular path until and unobstructed path is found, before executing the adapted coverage path. In some embodiments, establishing the coverage path that accounts for any detected obstacles further includes: when more than a predefined number of obstacles are detected within a predefined minimum distance of the robotic device and which obstacles are at least a preset number of degrees apart from one another, calculating a fourth center-return path, where the fourth center-return path is defined by a number of substantially collision-free point-to-point paths, and where the fourth center-return path corresponds with a number of straight lines each having a measured length with respect to the detected obstacles, and where executing the coverage path proceeds from a shortest to a longest of the number of straight lines. In some embodiments, establishing the coverage path that accounts for any detected obstacles further includes: calculating a fifth center-return path, where the fifth center-return path is defined by a number of substantially collision-free point-to-point paths, and where the fifth center-return path corresponds with a maximum turning angle and a number of straight lines each having a measured size with respect to the detected obstacles, and where executing the coverage path proceeds from a longest to a shortest of the number of straight lines.

In other embodiments, computing device program product for automated robotic movement for a robotic device using an electronic computing device are presented, the computing device program products including: a non-transitory computer readable medium; first programmatic instructions for causing the electronic computing device to establish a working zone; second programmatic instructions for measuring distances to all obstacles in the working zone thereby detecting all obstacles in the working zone; third programmatic instructions for establishing a coverage path that accounts for detected obstacles; fourth programmatic instructions for executing the coverage path such the robotic device covers the working zone at least once; if a new obstacle enters the working zone, fifth programmatic instructions for detecting the new obstacle and establishing an adapted coverage path that accounts for the new obstacle; and sixth programmatic instructions for executing the adapted coverage path where the programmatic instructions are stored on the non-transitory computer readable medium. In some embodiments, computing device program products further include: seventh programmatic instructions for bypassing the new obstacle; and eighth programmatic instructions for returning to the coverage path. In some embodiments, the first programmatic instructions for causing the electronic computing device to establish the working zone includes: ninth programmatic instructions for finding an X boundary in an X direction of the working zone; tenth programmatic instructions for finding a Y boundary in a Y direction of the working zone; and eleventh programmatic instructions for moving the robotic device to a center of the working zone. In some embodiments, computing device program products further include: thirteenth programmatic instructions for moving the robotic device to a new location if the $X_{axis}$ or $Y_{axis}$ established is less than a pre-determined minimum size.

In some embodiments, detecting the new obstacle causes an error to be logged, where when a first pre-determined number of errors are logged, switching from calculating the first center-return path to calculating the second center-return path, and where when a second pre-determined number of errors are logged, switching from calculating the second center-return path to calculating the third center-return path.

Embodiments of the present invention disclose a set of ergonomic coverage methods for reaching the surrounding areas in a radial movement pattern. In an embodiment, a system to detect obstacles and plan a movement pattern that accounts for them before moving, as opposed to a system that reacts to obstacles as they are encountered is provisioned. This proactive method promotes a substantially collision-free movement path before the autonomous robotic device starts to work. In a collision detection method, a robotic device's decisions are reactions to the input it receives from its sensors in real time. For example, in robotic devices with touch sensors, when a touch sensor detects a collision with an object, the robotic device makes reactive adjustments to its path so that it will not collide with the object. In a collision mitigation system, measurements and computations of surroundings are performed prior to the robotic device's movement. Once the robotic device identifies a path that it can take without colliding with the detected obstacles, it will move. By preplanning its cleaning paths, the robotic device may achieve better performance rates.

In an exemplary embodiment of collision mitigation, or open surface recognition method, a robotic device considers itself as the center of an imaginary circle. The robotic device identifies the radius of the circle as the smallest measured number before it detects an obstacle, and can then begin work within the circle with minimal or virtually no chance of colliding with other objects.

At any point, a collision detection method can be added to collision mitigation methods to allow more robustness and resiliency in a dynamic environment where objects in the working area are moving or moved.

In an embodiment of the invention, the robotic device creates virtual work zones to divide the workspace into manageable areas that can be cleaned systematically. Each working zone is calculated by measuring the distance between the robotic device and all obstacles on relative axes (X, −X) and (Y, −Y), followed by creation of a virtual zone. The autonomous robotic device establishes its work from the center point of each working zone before moving to a next adjacent working zone, which promotes more efficient management of the surroundings. Minimum and maximum acceptable distance variables can also be pre-programmed into the robotic devices or manipulated by the user to divide the area into suitably-sized working zones.

The methods, systems, and devices embodying features of the present invention provide a first cleaning pattern referred to herein as triangle path mode in which the robotic device establishes variable-sized triangles arrayed around a center point. Starting from the center point of the zone, the robotic device measures its distance to the nearest obstacle and turns a pre-determined number of degrees to measure the distance to the next obstacle. A table is provided with distance-to-angle ratios in order to approximate the largest triangle in which no area or substantially no area is left uncovered after the robotic device finishes its triangular path. In an embodiment, the ratios in the table are further based on the size of a cleaning brush of the robotic device. In this embodiment, the size of the angle retrieved approximates the largest triangle in which no area or substantially no area is left uncovered by the brush of the robotic device. Using the retrieved angle and the two measured distances, the method executes a triangular cleaning path. By establishing the corners of the triangles on the position of obstacles, the triangle path mode provides for the robotic device to clean the maximum amount of open space available. Establishing the size of the angles in the triangles on the distance between the robotic device and the obstacles, the triangle cleaning pattern provides for enhanced, as well as full coverage of the area within the triangle while minimizing redundancy, i.e. covering areas already cleaned. As contemplated herein, the term "cleaning" may be utilized to indicate a vacuuming action. However, embodiments should not be construed as limited to "cleaning." Methods disclosed herein provide coverage of a working zone by a robotic device. As such, the robotic device may apply any number of actions within that coverage zone such as, for example, painting, dusting, air drying, light activating, etc. As such, any action taken by the robotic device while the robotic device is moving along a path may be utilized in embodiments without limitation.

After calculating and executing a path, the robotic device returns to the center point of the working zone, then calculates and executes the next path, and continues this pattern until it finishes 360 degrees. Since the area of each triangle would naturally depend on the position of the two obstacles that, together with the center of the working zone, create the three corners of the triangle, the triangles formed may extend beyond or fall within the working zone. Although the distance of the obstacles can well exceed the boundaries of the working zone, in one embodiment of this invention, a maximum distance could be defined for the triangle's corners.

If there are unexpected obstacles or blockades in executing a triangle path mode, the robotic device attempts to adapt and continues cleaning in triangle path mode. The robotic device will keep a record of the number of errors encountered during the cleaning mode, and may alternate to a subsequent path mode if the number exceeds a preset threshold.

In a method embodying features of the present invention, the daisy path mode is introduced as a backup mode to the triangle path mode. The daisy path mode may automatically trigger if the robotic device encounters more than a preset number of problems during performance of its job while operating the triangle cleaning, the less redundant pattern. The daisy path mode performs similar to the triangle path mode, but forms isosceles triangles around the center point. Instead of establishing the corners of the triangles on two obstacles at varied distances, the corners are fixed at distances from the center point based on the first obstacle that the robotic device measures. The angle joining the two like sides of the triangle is a fixed size corresponding with the brush size of the robotic device in order to ensure complete coverage of the area using formed adjacent triangles. Using the length of the two equal sides of the triangle and the fixed angle between them, the method determines the remaining unknown triangle side and angles that it needs in order to execute the path. The robotic device travels from the center point to the measured obstacle, turns at the calculated angle, travels the distance determined by the length of the two like sides and the angle joining them, then turns at the next calculated angle, and returns to the center point. The method repeats the process to cover all 360 degrees around the center point.

In an embodiment, an asterisk path mode may be used. In an embodiment, the asterisk path mode may be utilized if the robotic device encounters a number of problems during completion of its job while running the daisy path mode. Asterisk path mode in some embodiments, may be, but not necessarily, a last resort among the three introduced patterns due to its inherent redundancy while delivering the highest probability for effective completion in areas with high number of unforeseen obstacles. Asterisk cleaning method is based on the same collision-mitigation concepts described above, however in this method, the robotic device will first measure a linear path from the center point to the nearest obstacle, then clean along this path up to the obstacle and back to center point on the same or substantially the same line. This increases the probability that each time the robotic device undertakes a new path, it is almost certainly substantially collision-free. In operation, the robotic device continues the pattern, traveling in linear radial paths around the center point, until the job is completed.

In an embodiment, a complimentary cleaning pattern herein referred to as the closest obstacle path (COP), may further be utilized. In operation of a method embodying features of the COP, after the robotic device creates a working zone, the robotic device rotates 360 degrees, measuring the robotic device-to-obstacle distance from the center point. If the robotic device detects smaller than acceptable distances to surrounding objects spaced at least a minimum predetermined angular distance apart, it activates COP mode. The acceptable distance to obstacles can be preset or adjusted by the user. (If the obstacles are not close enough to trigger COP, the robotic device activates triangle path mode and operates as set forth above.). When COP is activated, the robotic device assigns cleaning priority of the measured linear paths from shortest to longest path. The robotic device services each path, retracing its outbound path to return to the center point, and completes with the longest path, thereby leaving the confined space. In this way, COP increases the probability that a robotic device will visit every or substantially every corner of a tight space before leaving, and provides more thorough overall coverage.

In an embodiment, a user-selected mode, farthest obstacle path (FOP), may further be utilized. This mode can be activated by human intervention and is a best effort cleaning mode relative to time. When FOP is engaged, the robotic device starts from the center point of the working zone and measures the distances to surrounding objects around a center point. The method then assigns cleaning priority to the paths from longest to shortest path. The path from the center point to the obstacle and back are along the same line, so the cleaning to coverage rate is constant. Also, cleaning of tight corners and confined areas will be on a best effort basis. This mode covers the area faster but less thoroughly compared to the other methods of this invention.

BRIEF DESCRIPTION OF THE SEVERAL VIEWS OF THE DRAWINGS

Non-limiting and non-exhaustive features of the present invention are described with reference to the following figures, wherein like reference numerals refer to like parts throughout the various figures.

FIGS. 3A and 3B is an illustrative representation of the triangle path mode development method;

FIG. 4 is an illustrative representation of the triangle cleaning pattern;

FIG. 19 is an illustrative representation of a table utilized to determine turning angles in the Triangle cleaning pattern embodying features of the present invention;

DETAILED DESCRIPTION

Figure 1:
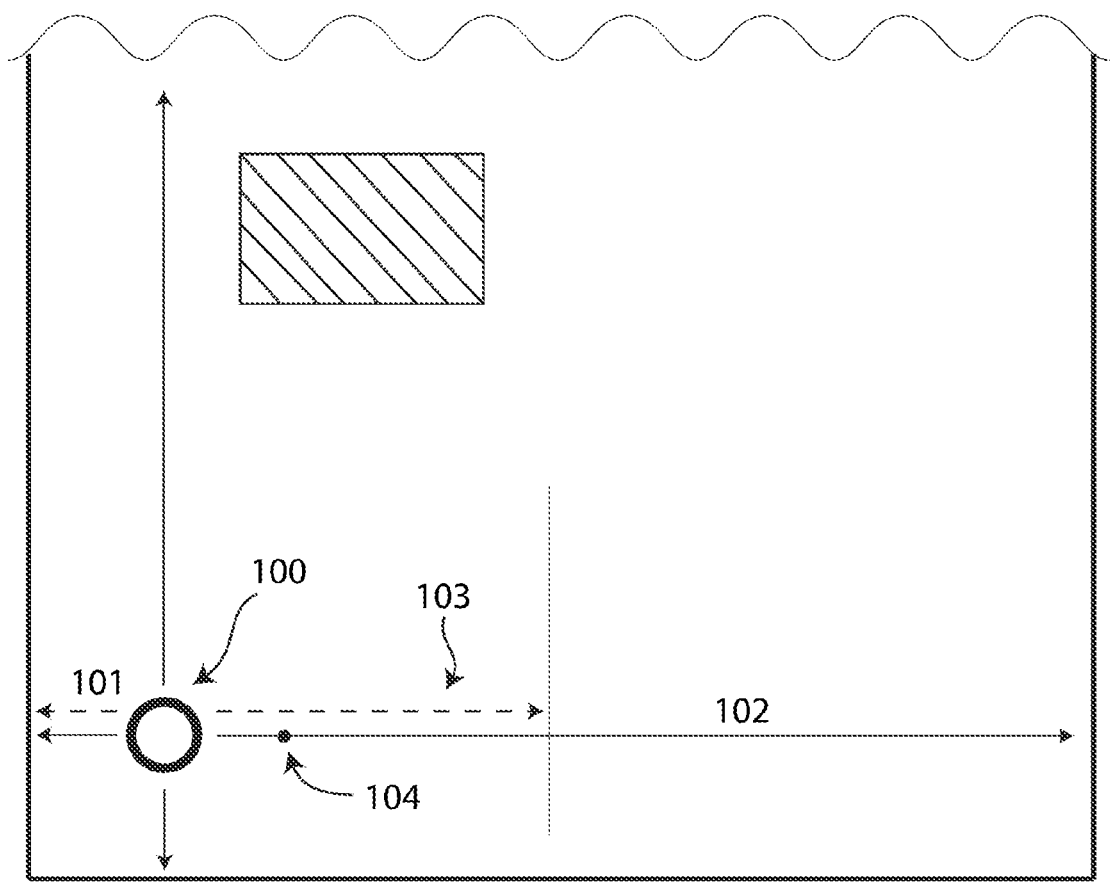
FIG. 1 is an illustrative representation of the initial starting point and distance measuring of an autonomous robotic device embodying features of the present invention.

As will be appreciated by one skilled in the art, the present invention may be a system, a method, an apparatus, and/or a computer program product. The computer program product may include a computer readable storage medium (or media) having computer readable program instructions thereon for causing a processor to carry out features of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Features of the present invention are described herein with reference to flowchart illustrations and/or block diagrams of methods, robotic device (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing robotic device to produce a machine, such that the instructions, which execute via the processor of the computer or other programmable data processing robotic device, create means for implementing the functions/acts specified in the flowchart and/or block diagram block or blocks. These computer readable program instructions may also be stored in a computer readable storage medium that can direct a computer, a programmable data processing robotic device, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing robotic device, or other device to cause a series of operational steps to be performed on the computer, other programmable robotic device or other device to produce a computer implemented process, such that the instructions which execute on the computer, other programmable robotic device, or other device implement the functions/acts specified in the flowchart and/or block diagram block or blocks. The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing robotic device to cause a series of operational steps to be performed on the computer or other programmable robotic device to produce a computer implemented process such that the instructions which execute on the computer or other programmable robotic device provide processes for implementing the functions/acts specified in the flowchart and/or block diagram block or blocks.

Embodiments of the present invention introduce a series of methods for autonomous cleaning robotic devices and floor coverage systems. The autonomous robotic device in this document is referred to as a cleaning robotic device but area coverage methods disclosed herein are not limited to one type of autonomous robotic device and may be utilized by any number of different types of robotic devices that need to efficiently cover a workspace. Thus, the usage or references to cleaning is not intended to limit the scope of the invention, rather serve as an illustrative example. The present invention provides for one or more, typically one or more of five, methods for center-return path movement patterns, including a triangle path mode, a daisy path mode, an asterisk path mode, a closest obstacle path mode, a farthest obstacle path mode. In an embodiment, the device may incorporate all methods, including all five methods, to form a comprehensive method that a robotic device may use to cover its workspace. As may be appreciated, the terminology utilized to describe these various center-return path methods is not intended to be limiting with respect to the definitions commonly applied to the terminology. For the purpose of this comprehensive coverage suite, the methods may be processed and controlled by a robotic device's control system and CPU in accordance with the inputs from a various array of sensors. Methods provided herein may probe an area and keep a record of recently executed paths as well as surrounding obstacles locations. A method may utilize area information for its operation, namely division of the work area into smaller spaces called working zones, and choosing a movement pattern for operation such as cleaning.

In some embodiments, methods divide a workspace into smaller virtual sections, referred to as "zones" or "working zones" in order to achieve better coverage management and cleaning efficiency. Before starting work in a location, methods embodying features of the present invention establish a working zone. In order to establish appropriately-sized zones within any size workspace, a series of minimum or maximum accepted distances may be used during the working zone creation process. Once methods cover the working zone from the center point of a zone, an additional neighboring zone/s may be created whereupon the method covers newly developed zone.

As used herein, the term Obstacle refers to any entity that obstructs the device's movement; and the term debris refers to particles, objects or refuse that have been or can be vacuumed by a floor-cleaning robotic device.

FIG. 1 is an illustrative representation of the initial starting point and distance measuring of the autonomous robotic device embodying features of the present invention. In FIG. 1, robotic device 100 uses distance measuring sensors to analyze and detect obstacles in the surrounding area (e.g., area nearby the robotic device) and establish a reasonable central point for its operation. The autonomous robotic device measures the distances to obstacles on axis X, −X (101, 102), then virtually limits the maximum combined range of the axes. As shown in FIG. 1, the longer range 102 is virtually limited to smaller range 103 with regards to the programmed maximum acceptable distance in the system for creating a working zone. Then, the robotic device will average the acquired and trimmed ranges 101, 103 to find the center 104 of axis X of the working zone in question.

Figure 2A:
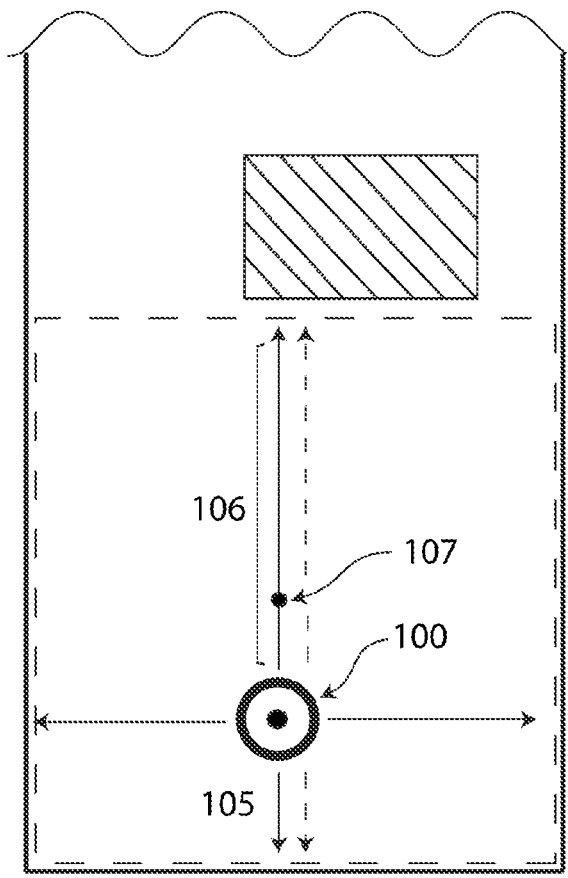
FIGS. 2A, 2B, and 2C are illustrative representations of the creation of a working zone within the workspace; the robotic device's movement to the center of a working zone, embodying features of the present invention; and the robotic device's measurement of distance to obstacles in 360 degrees around the center point.
Figure 2B:
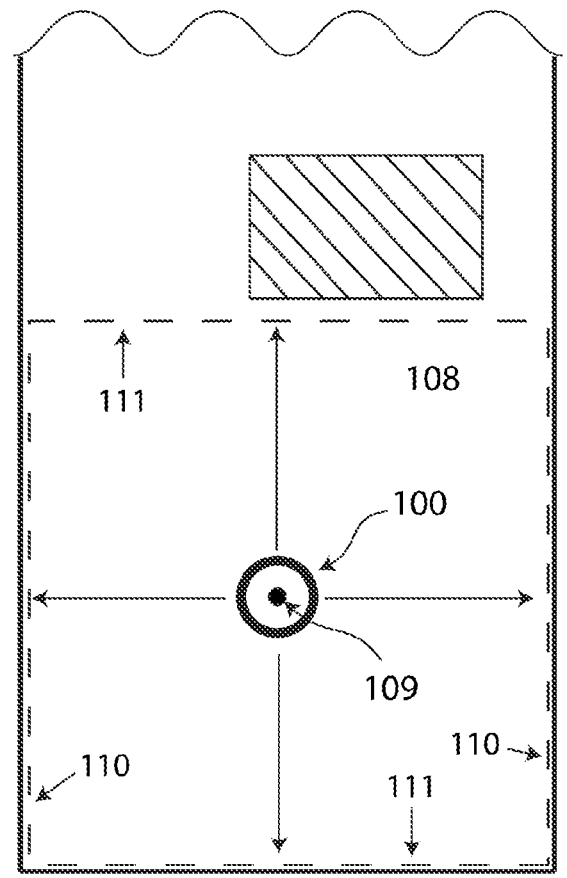

FIG. 2 is an illustrative representation of a method embodying features of the present invention for creation of a working zone within the workspace and the robotic device's movement to the center of the working zone. Continuing with the process, FIG. 2A illustrates robotic device 100 moved to the middle point of axis X, 104 as previously calculated. From there, the robotic device turns and uses distance measuring sensors to assess the axis Y ranges 105, 106. If the combined ranges of axis (Y, −Y) exceed the maximum allowed distance of the system, a virtual cap or preset maximum allowed distance may be applied on the sum as before. The system uses the average of the values of axis Y variables 105, 106 to find and drive to the middle of axis, 107. As a result, as shown in FIG. 2B, the robotic device is now in the center point 109 of the zone 108 bound by the X axis maximum 110 and Y axis maximum 111. Through this process, the robotic device creates a virtual working plane, or working zone. 2B shows robotic device 100 positioned in the center point of the newly established working zone 108.

Figure 2C:
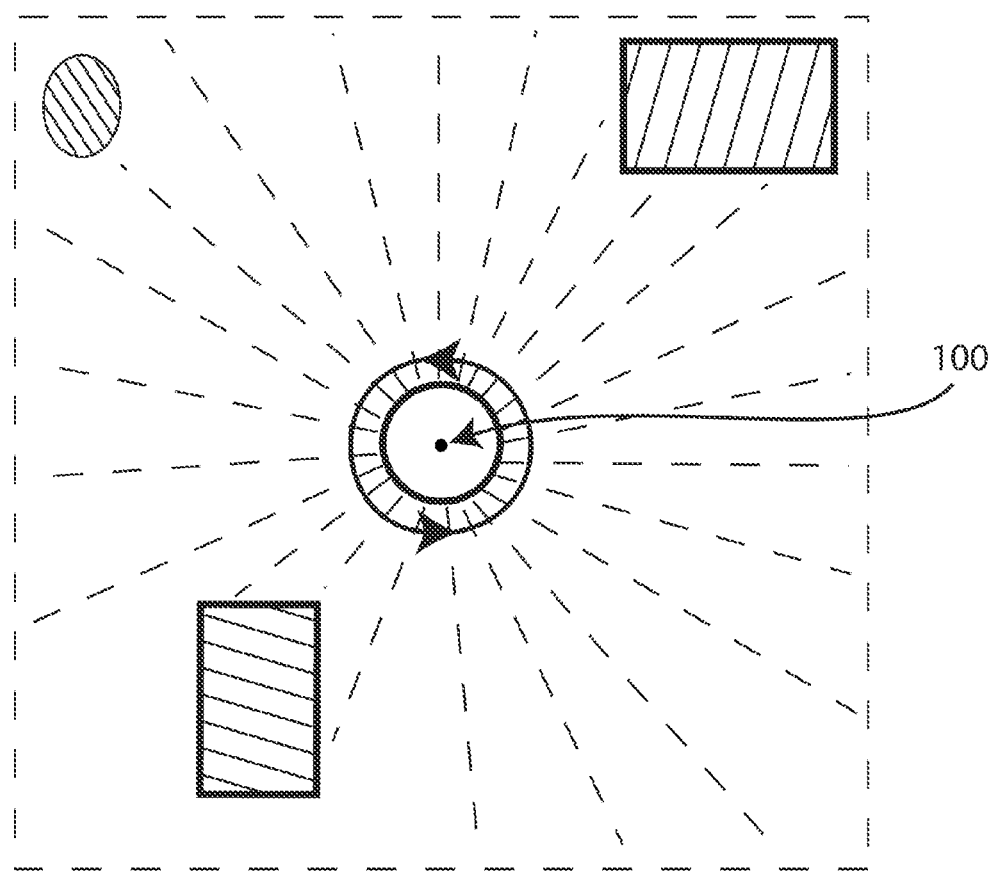

As shown in FIG. 2C, once a working zone has been established, the robotic device 100 determines which movement pattern to use for the particular zone by rotating 360 degrees and measuring its distance to obstacles all the way around using distance measuring sensors. If the method detects three or more obstacles that are closer to the robotic device than a preset minimum distance and at least a predefined number of degrees apart are detected, "closest obstacle path" path mode is activated. If not, "triangle path mode" coverage method is activated.

FIG. 3 is an illustrative representation of the triangle path mode development process, embodying features of the present invention, and showing robotic device 100 positioned in the center 109 of working zone 108. Triangle path mode development proceeds in part by taking advantage of a mathematical rule that states that a triangle may be built knowing only the length of two sides of the triangle and the angle between the sides. The robotic device's processor uses this rule in the following formulas (FIG. 3B, side-angle-side (SAS) formula drawing):

$$[c2=a2+b2-2ab \cos(C)] \text{ and } [a/\sin A=b/\sin B=c/\sin C]$$

This equation allows the processor to calculate unknown components of a triangle and build a substantially collision-free triangulated path. The autonomous robotic device measures the distance to the first obstacle in the direction that it is heading and uses this as first side 110 of the triangle. The method then consults a table, as shown in FIG. 19, which is an illustrative representation of a table utilized to determine turning angles in the triangle cleaning pattern embodying features of the present invention, to determine the approximate maximum number of degrees the robotic device can turn for the second side of the triangle based on the first measured distance while still covering all the area between the two sides with its brush. The table yields the approximate largest angle based on the first measured distance and the robotic device's brush size. As illustrated, the turning angles given are based on a brush with a length of 9.5"-10.0". A desirable goal is to establish triangles that are as wide as possible without leaving any part of the interior of the triangle uncovered when the robot travels along the linear path with its brush. This approximates the largest possible triangle in which no area will be left uncovered by the robotic device's brush once the robotic device finishes its triangular path. The robotic device turns the number of degrees indicated by the table, then uses its distance measuring sensors to measure the distance from that point to the nearest obstacle (i.e. the wall 112) to create second side 111 of the triangle. Using these two sides and angle 113 between them, the method can construct the rest of the triangle and execute the triangular path. Upon completing the triangular path, the robotic device will be back at the center point 109 of the working zone 108. From the center point 109 of the working zone, the robotic device turns a preset number of degrees based on the brush size of the device and the amount of overlap desired between paths, then begins measurement for its next triangular path 114. The robotic device repeats the process, as shown in FIG. 4, which is an illustrative representation of the triangle cleaning pattern. As shown in FIG. 4, the method creates different adjacent triangles 402, 404, and 406, etc. arrayed around the center point 109 until the full 360 degrees of working zone 108 is covered. As used herein throughout this application, substantially collision-free may refer to either collision free or mitigated collision (i.e., substantially collision-free).

Figure 5:
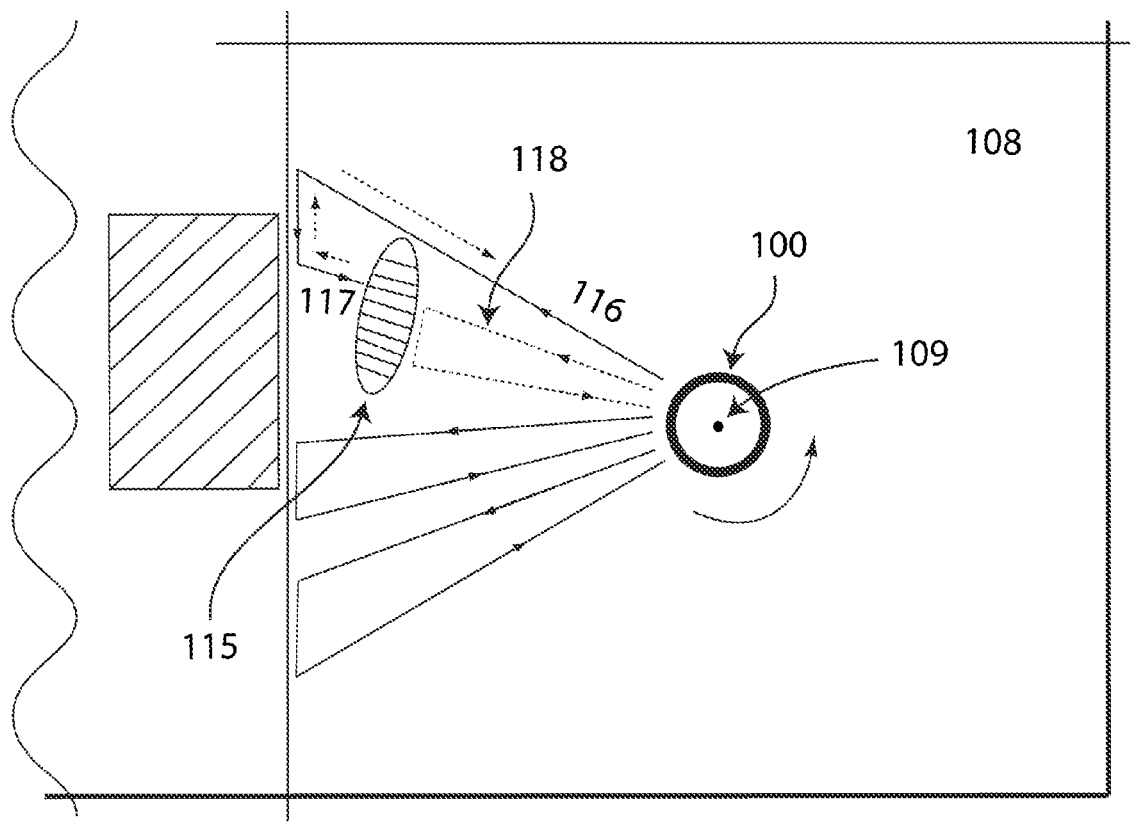
FIG. 5 is an illustrative representation of an example of potential disruption and counter-action during the triangle path mode embodying features of the present invention.

FIG. 5 is an illustrative representation of an example of potential disruption and counter-action during the operation of the triangle path mode embodying features of the present invention. In particular, FIG. 5 shows a scenario in which the autonomous robotic device 100 encounters obstacle 115 that appeared (or was detected) within a workspace after robotic device 100 probed and started its coverage of the triangular path beginning with side 116. The position and time of the appearance of an obstacle can result in different conditions to which the robotic device adapts and reacts accordingly. In one scenario, the robotic device in this example already used the SAS mathematical formula for calculating the path and is in the middle of the cleaning process. The robotic device cleaned side 116 but in returning path 117, a newly appeared (or detected) obstacle 115 blocked its path. In one embodiment of the invention, a timer is activated after an obstacle is encountered, and the robotic device will only react after the timer reaches 0. If the obstacle no longer obstructs the path after the timer reaches 0, the robotic device will continue its prior cleaning path 117. If the object continues to obstruct the path after the timer reaches 0, the robotic device counts this as an interruption during the current mode and employs its method for adapting or responding to an error. In another embodiment, the robotic device has no timer and responds to the obstruction immediately. In both embodiments, if the obstacle remains, the robotic device adapts by retracing its path along side 117, then side 116 back to the center 109 of the working zone. From the center point 109 of the zone, the robotic device turns to the previously planned side 117 of the triangle, the turning angle having been previously calculated when establishing the original triangular path. The robotic device uses its distance measuring sensors to restart the path building process for a new triangle. The first side 118 of the triangle covers the area of the previously planned path that is not obstructed by the obstacle 115.

As the robotic device adapts to the obstruction, the controller system keeps a record of the mishap or error. If the number of errors reaches a predetermined threshold during the current cleaning mode, the next fallback method, "daisy path" mode, will be activated in place of triangle path mode.

Figure 6A:
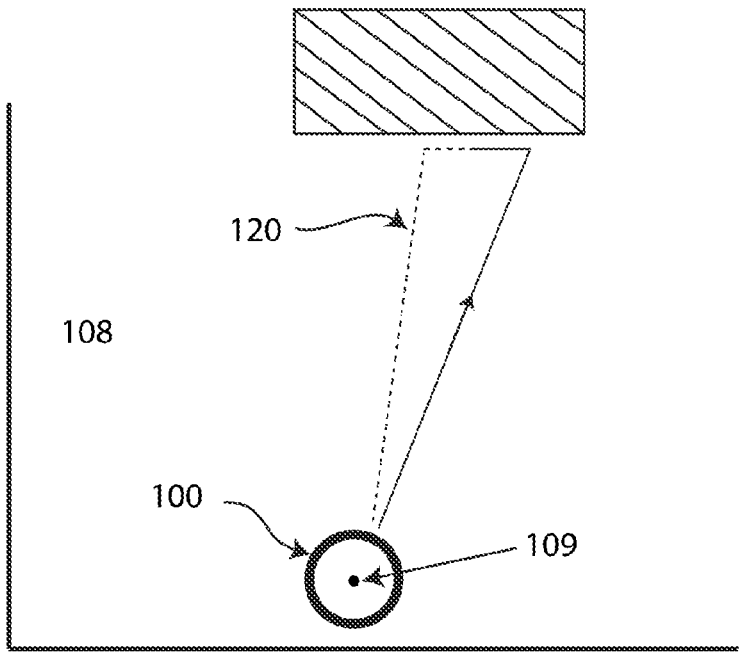
FIGS. 6A and 6B are illustrative representations of examples of different disruption and counter actions during the triangle path mode embodying features of the present invention.
Figure 6B:
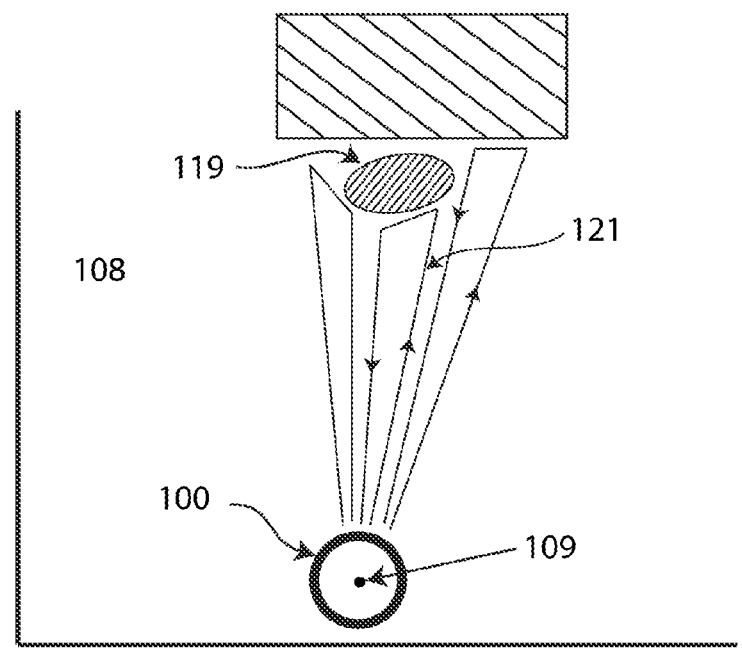

FIGS. 6A and B are illustrative representations of an example of a different disruption and another counter-action during triangle path mode embodying features of the present invention. In particular, FIG. 6B shows the robotic device's remedy if obstacle 119 is encountered on the second leg of the triangle in triangle cleaning of working zone 108. The robotic device 100 returns directly from the location where the obstruction occurred to the center point 109 of the working zone, resulting in a triangular path within the previously planned triangle 120 shown in FIG. 6A. Once back at the center point, the robotic device continues triangle cleaning as normal, and measures for a new path 121.

Figure 7A:
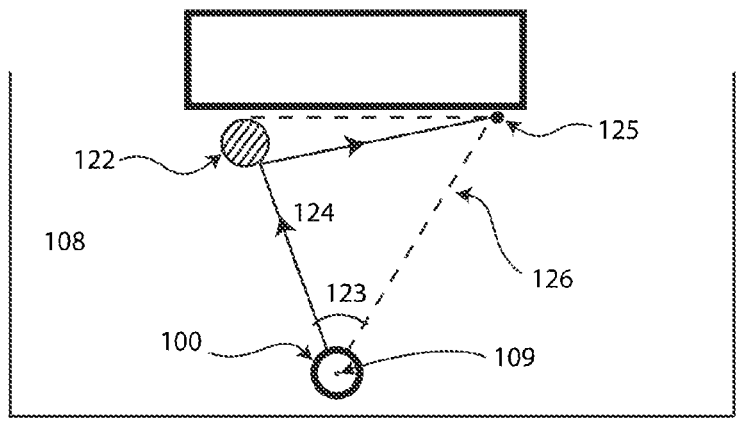
FIGS. 7A, 7B, and 7C are illustrative representations of an example of a third disruption and counter-action during the triangle path mode embodying features of the present invention.

FIG. 7 is an illustrative representation of an example of a third disruption and counter-action during triangle cleaning embodying features of the present invention. As seen in FIG. 7A, during the execution process of working zone 108, robotic device 100 encounters obstacle 122 while cleaning first side 124 of a triangle. In response, robotic device 100 will clean side 124 up to blockage 122 and then recalculate the angle that it needs to turn from that point in order to reach the previously identified triangle corner 125. The method utilizes the new, shortened length of the first side 124 of the triangle, the length of third side 126, and the previously determined angle 123 between them to calculate an adapted path. The robotic device then turns the calculated number of degrees and measures the distance ahead with its distance measuring sensors to verify whether the adapted path from its current position to triangle corner 125 is free of obstacles. If the adapted path is unobstructed for at least the length of the adapted path, the robotic device will take this adapted path to complete a new triangle within the previously planned triangular path.

Figure 7B:
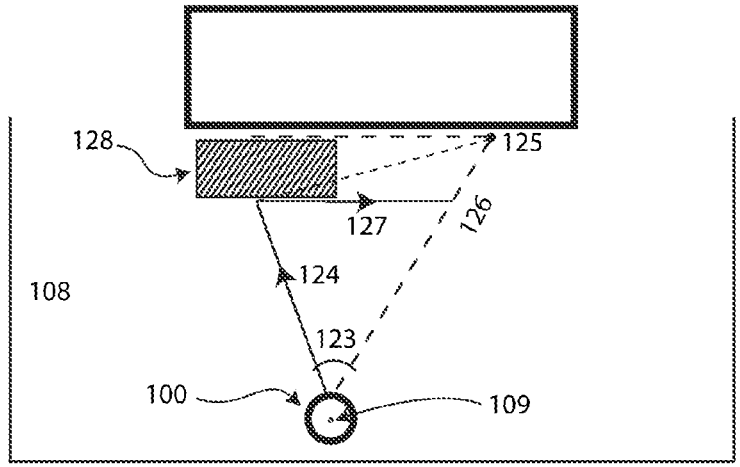

If, as illustrated in FIG. 7B, the adapted path from the current position to the previously planned corner 125 is obstructed by an obstacle 128, the robotic device 100 will turn a preset number of degrees toward the planned third triangle side 126, then formulate a new triangle using this new angle, the new shortened side 124 of the triangle, and the original turning angle 123 at the center point 109. This will provide the robotic device with a new distance 127 for the second side of the triangle. The robotic device measures the distance ahead to see whether or not the path is obstructed for the length of the second side. If the path is clear, the robotic device takes this path to complete a smaller triangle within the area of the original planned triangular path.

Figure 7C:
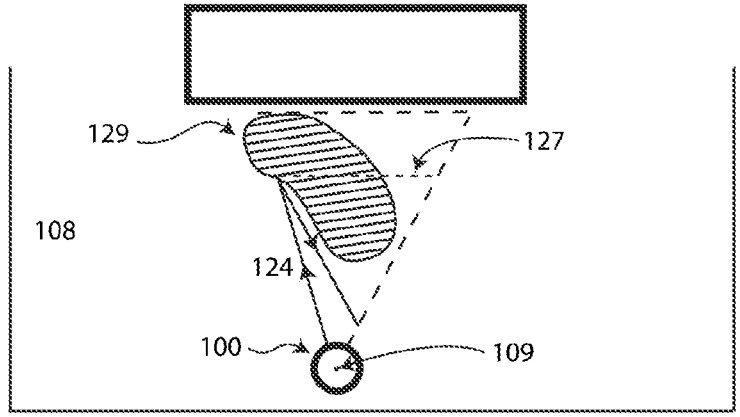

If, as illustrated in FIG. 7C, an obstacle 129 obstructs the formulated path 127, the robotic device 100 repeats the process of turning a preset number of degrees, calculating a new triangle, and measuring the distance ahead until either the largest clear triangular path is identified or the robotic device has met a predefined maximum number of attempts, at which point it will simply return to the center point along the original triangle side 124 and restart the process of triangle cleaning from that point. As may be appreciated, the above adapted paths may proceed in any order without limitation.

In some embodiments and in general, methods disclosed herein may fall back to the other cleaning modes after encountering a certain number of errors during the robotic device's cleaning operation in Triangle or daisy path modes. In an exemplary embodiment, the coverage methods are selected in the order of: Triangle path mode, daisy path mode, then asterisk path mode; however other orders of modes may be utilized without limitation. If the autonomous robotic device reaches its threshold for errors within a predefined amount of time in the normal operation of the triangle path mode, it will activate the second mode, "daisy path mode". Various path modes will be discussed in further detail below for FIGS. 20-22. Likewise, if a certain number of errors occur within a certain amount of time during daisy cleaning, the robotic device will activate asterisk path mode, which is the more redundant of the three path modes provided. In an embodiment, after lapse of certain predetermined number or periods of interruption-free activity in a relatively more redundant cleaning mode, the robotic device may switch back to a relatively less redundant, e.g., its primary, cleaning mode, e.g., triangle cleaning.

Figure 8:
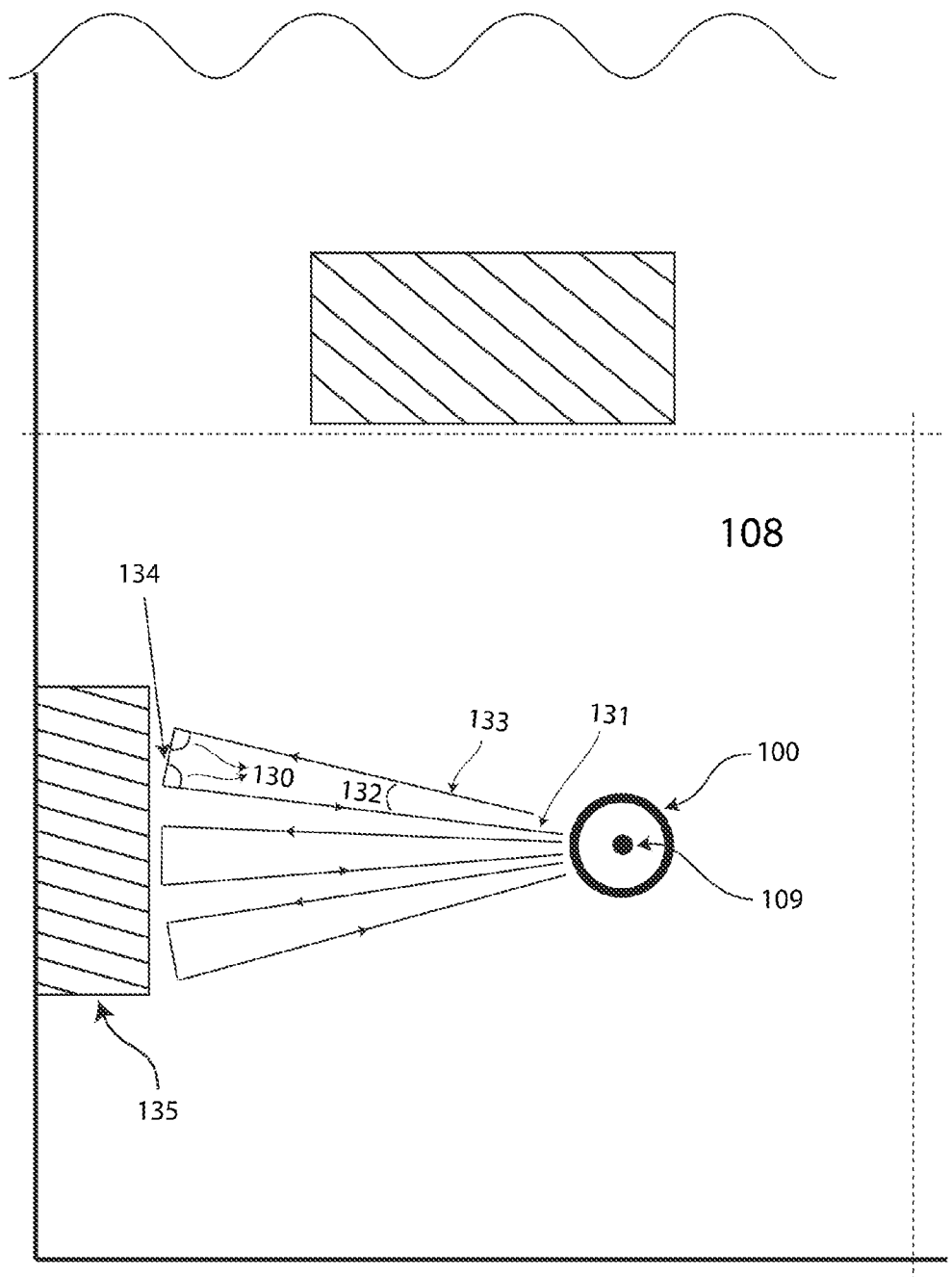
FIG. 8 is an illustrative representation of the daisy path mode development method embodying features of the present invention.

FIG. 8 is an illustrative representation of the daisy path mode development process embodying features of the present invention. If unforeseen obstacles in the work area interrupt triangle path mode frequently enough for the error threshold to be reached, the method activates daisy path mode. Daisy path mode works similar to triangle path mode, but forms isosceles triangles around the center point of the working zone. Instead of basing the corners of the triangles on two obstacles at varied distances, the corners are fixed at a distance from the center point of the working zone based on the first obstacle that the robotic device measures. The angle joining the two like sides of the triangle is a fixed size based on the brush size of the robotic device in order to ensure complete coverage of the area using formed adjacent triangles. In general, the larger the brush, the smaller the like angles may be. A robotic device with a very long brush should be able to cover the area with wider isosceles triangles than a robotic device with a very short brush. Thus, while the angles of the triangle are determined by the brush size, the method will work with any size brush. As illustrated, the size of the fixed angle 132 dictates the size of the corresponding angles 130. The robotic device 100 uses distance measuring sensors to measure the distance 133 to the first obstacle 135 and uses that length for the sides 133 and 131 of the triangular path. The remaining unknown side length 134 is calculated using the known figures and the SAS formula. Robotic device 100 travels from the center point 109 along the first side 133 of the triangle to measured obstacle 135, turns at calculated angle 130, travels the calculated distance 134, then turns at next calculated angle 130, and returns along 131 to the center point 109 of the working zone. The method repeats the process to cover all 360 degrees around the center point.

Figure 9:
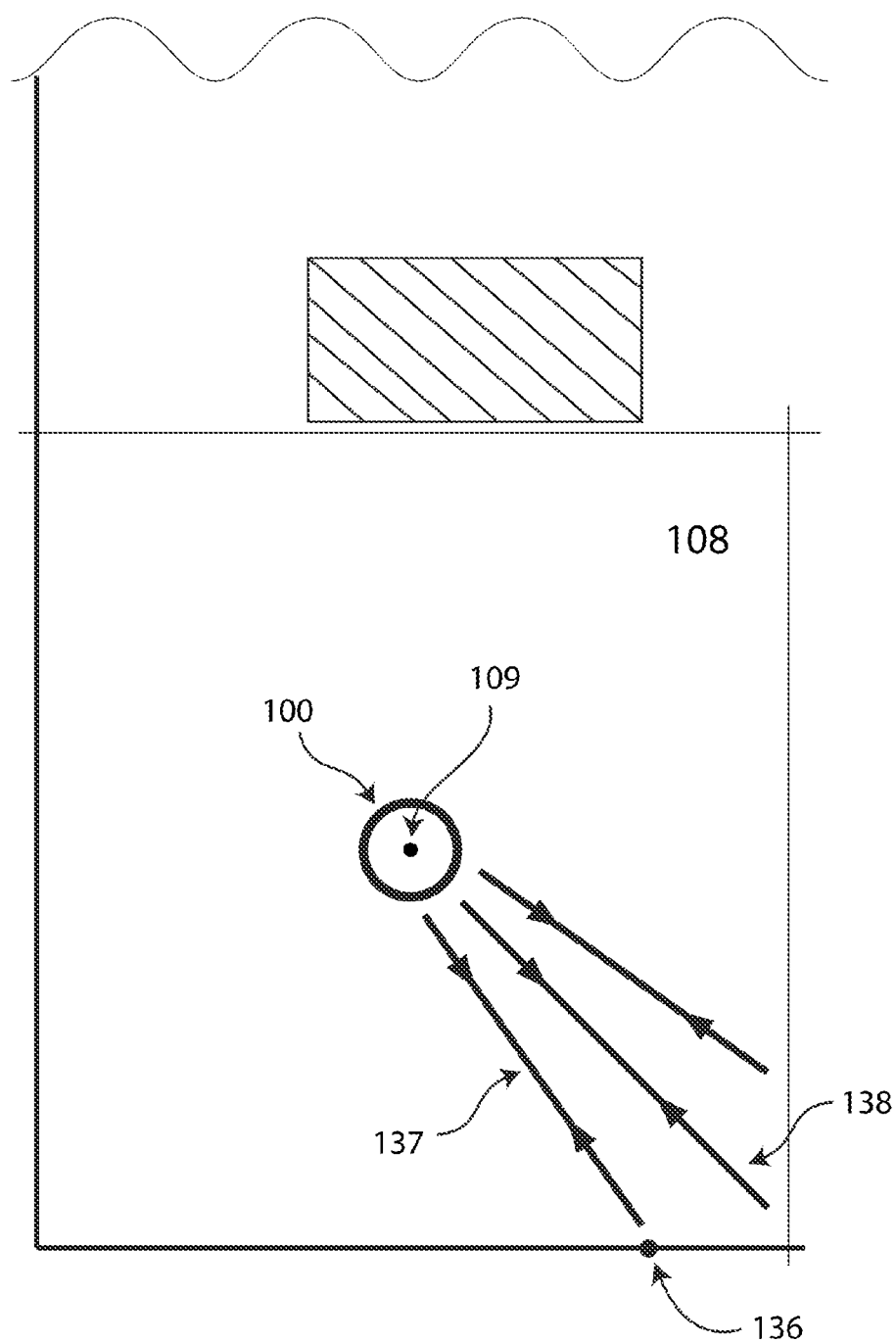
FIG. 9 is an illustrative representation of the asterisk cleaning path development method embodying features of the present invention.

FIG. 9 is an illustrative representation of the asterisk path mode development process embodying features of the present invention. In an embodiment, the asterisk path mode acts as a fallback for daisy path mode. In an embodiment, if, during daisy path mode, the robotic device reaches a minimum threshold of errors, the method will fall back to a simpler mode-asterisk path mode. In this mode, autonomous robotic device 100 simply travels from the center point 109 of the working zone to the nearest obstacle 136 in line 137, cleaning that path, and then returning to the center point of the working zone along the same line 137. The length of each line may be variable and may be limited to the nearest obstacle or boundary. In one embodiment, a preset maximum could be defined that dictates a cap for distance regardless of how far the nearest obstacle is. The process of cleaning in asterisk path mode continues by turning a pre-determined number of degrees based on the size of the brush with respect to adjacent line 138, measuring the next distance, and repeating the same process for the entirety of working zone 108. In one embodiment, if external environmental changes force or block the robotic device's path more than a certain number of times in this mode, methods may stop operation, reset all thresholds to zero, and adapt by beginning the cleaning patterns again starting with triangle path mode. In another embodiment, the robotic device continues using asterisk path mode until it has completed the current working zone regardless of how many interruptions it encounters.

In one embodiment of the invention, the robotic device will attempt to complete cleaning in each working zone using its current method (falling back as necessary to the secondary or tertiary methods). Once it has completed cleaning in a working zone and moves to a new working zone, all of the error counters will be reset and the method of operation will begin again with the primary cleaning mode.

In another embodiment, if the robotic device is using any mode other than the primary mode (e.g. daisy path mode, etc.), the robotic device will return to the primary mode after completing a preset number of paths without interruption within the current working zone. The number of paths may be preset to any number during manufacture without limitation in embodiments. If the threshold for uninterrupted paths is not met, the robotic device will continue using the current cleaning method until it has completed cleaning in the working zone, after which point it begins cleaning the next working zone with the primary cleaning mode. In other embodiments, going back to the primary cleaning mode/pattern may be set to happen after a certain amount of time lapses without interruption or after the robotic device has traveled a certain amount of distance without interruption.

Figure 10:
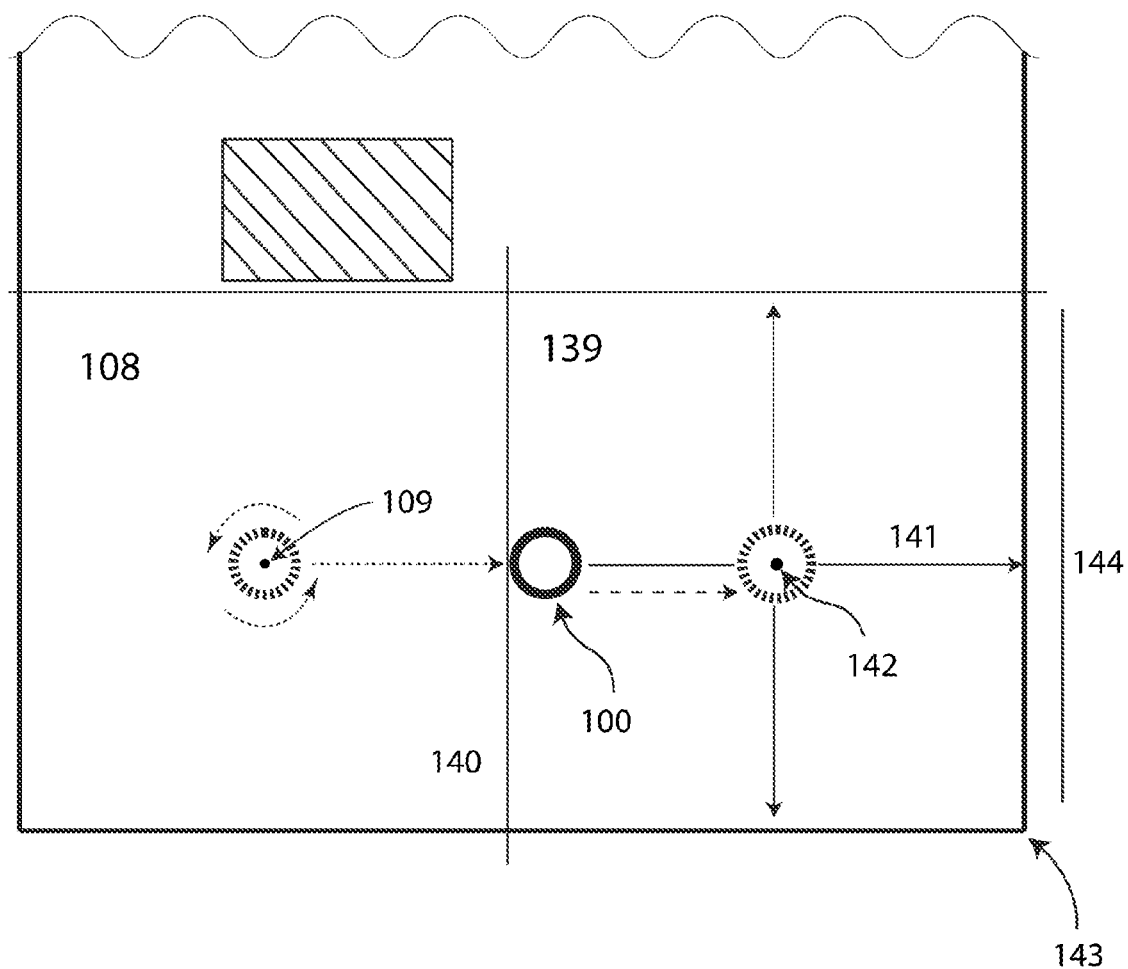
FIG. 10 is an illustrative representation of the robotic device's establishment of new working zones, embodying features of the present invention.

FIG. 10 is an illustrative representation of the robotic device's movement between different working zones, embodying features of the present invention. In particular, FIG. 10 illustrates the steps of the procedure that autonomous robotic device 100 takes in order to move from a completed, cleaned working zone 108 to create new working zone 139 to work in. As shown in FIG. 10, when robotic device 100 completes working zone 108, the robotic device returns to original center point 109, then moves to the working zone 108 border 140, the x axis maximum. From there, the method measures the distance ahead (141) using its distance measuring sensors in order to assess the clearance between the robotic device 100 and the nearest obstacle ahead, in this case, the wall 143. If the distance is greater than the maximum allowable distance discussed as disclosed above for FIG. 1, the robotic device will apply a virtual limit to the distance. Then the robotic device moves to the center point of newly created axis X 142. From there, the robotic device continues creating a virtual working zone on axis Y 144 as described before and positions itself in the center of the combined ranges. Thus, the robotic device creates new neighboring working zone 139 next to last working zone 108 to continue its coverage operation. If the device's distance measuring sensors detect that there is less than a minimum amount of obstacle-free distance on the axis X to create a new working zone, then the robotic device begins the zone creation process from another unattended direction of the working zone 108 (i.e.: Y, −Y, −X) until the distance measuring sensors detect that enough space is available in the chosen direction.

Figure 11:
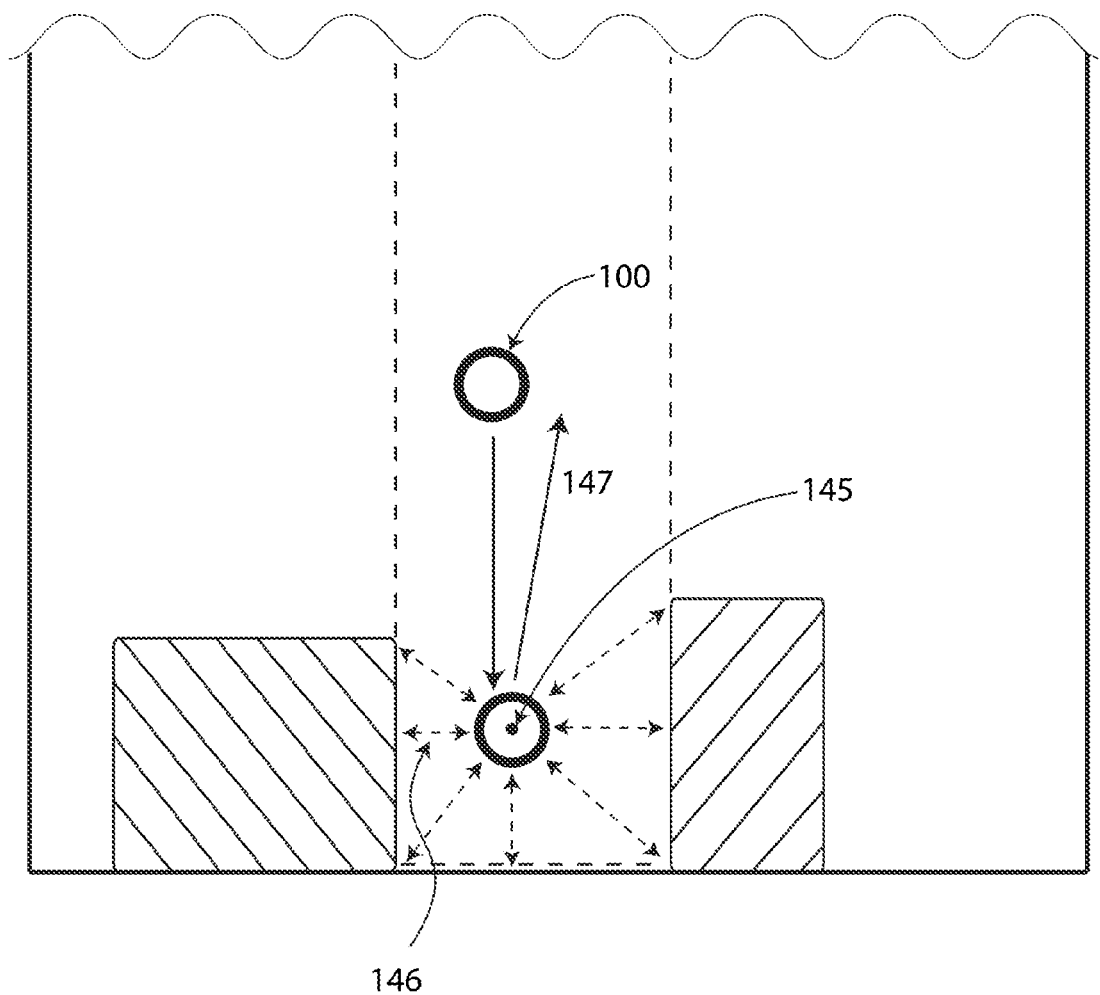
FIG. 11 is an illustrative representation of the closest obstacle path mode embodying features of the present invention.

FIG. 11 is an illustrative representation of the closest obstacle path (COP) operation method embodying features of the present invention. COP is designed specifically to deal with confined spaces that may have numerous obstacles within them. Usually, when a cleaning robotic device using a random navigation system enters or is placed in a confined area, such as beneath a table or between two close objects, the device navigates its way out before completely cleaning the area. Typically, conventional devices have no method for ensuring that the smallest obstacle-free areas within the confined space are cleaned. Embodiments disclosed herein provide a way of identifying confined spaces before beginning work and activating a method to more effectively service such an identified area. As mentioned previously, after a working zone has been created, robotic device embodiments rotate to complete a 360 degree turn around a center point of a working zone, measuring the robotic device's distance to obstacles at preset intervals. If at least a preset number of obstacles are closer to the robotic device than a predefined minimum distance and at least a preset number of degrees apart from each other relative to the center point, COP is activated. This method ensures or increases the probability that the confined area is completely serviced before the robotic device leaves the area. In FIG. 11, robotic device 100 moves to position 145, the center of a new working zone, which happens to be a confined area. The robotic device measures the distance ahead with its distance measuring sensors from the center point 145 in 360 degrees. COP is activated upon finding a minimum number of radial paths shorter than the predefined requirement and spaced adequately apart. The method then assigns cleaning priority to the measured radial paths in order from shortest radial path 146 to longest. The robotic device cleans each path in the same manner as in asterisk cleaning: that is, the robotic device travels from the center point to the nearest obstacle, then returns on the same line to the center point. One difference between asterisk cleaning and COP is the order of the paths cleaned. The robotic device attends to all the paths in order from shortest to longest, driving out of the location by attending longest radial path 147 last.

Figure 12:
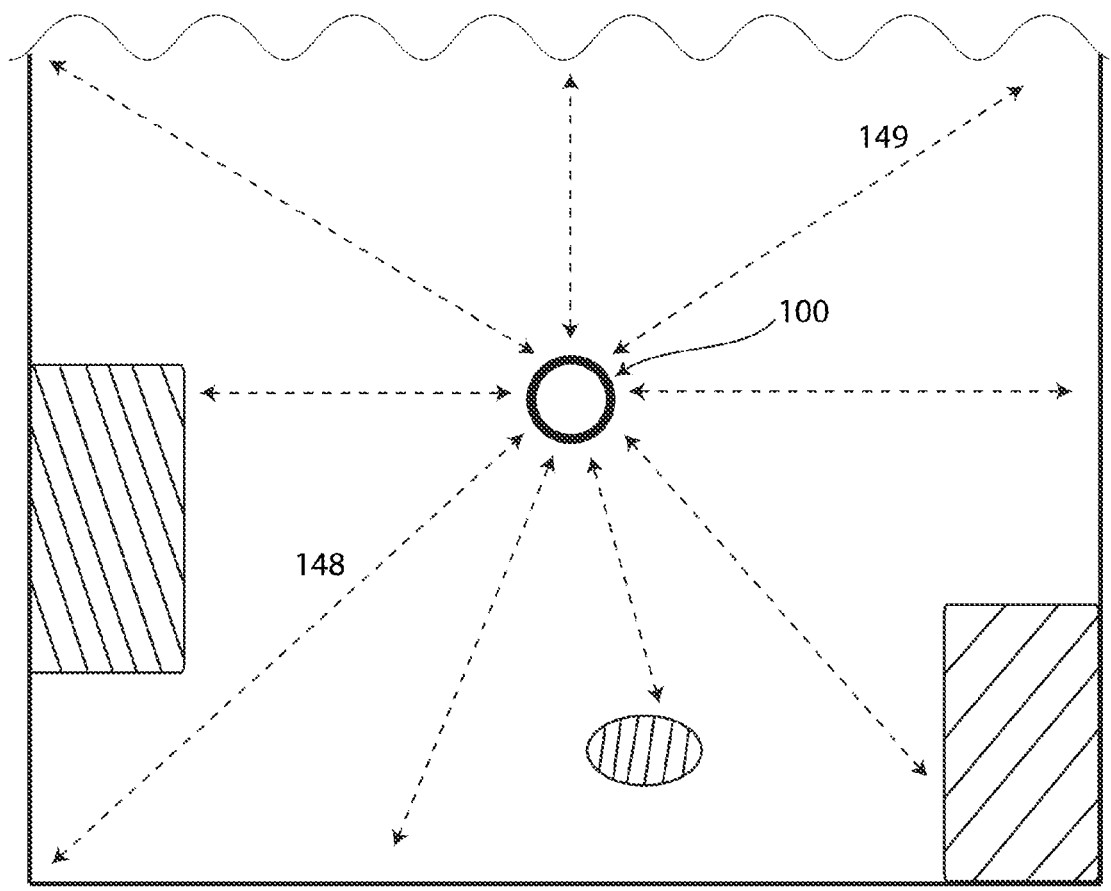
FIG. 12 is an illustrative representation of the farthest obstacle path mode embodying features of the present invention.

FIG. 12 is an illustrative representation of the farthest obstacle path (FOP) operation method embodying features of the present invention. In an embodiment, this is a manually selected mode. FOP attempts to clean the most amount of space in a limited amount of time, without prioritizing small confined areas. Percentage of area covered versus time, rather than thorough coverage, is the goal of this method. In an embodiment, in an FOP method, redundancy is 50 percent at all times, unlike random cleaning methods in which redundancy increases significantly over time. Because the robotic device travels along the same path from the center point of a working zone to an obstacle and back to the center point, and, since the robotic device's traveled paths are stored in its memory, the robotic device does not revisit paths it has already cleaned. FOP works similar to COP however the robotic device positions itself in a central point of the workspace and analyzes the surroundings, giving priority to measured radial paths in order from longest path to shortest path. As illustrated, robotic device 100 cleans longest path 148 first, returns to the center point, then cleans next longest path 149, continuing this process until the entire 360 degree area is serviced. Movement may proceed clockwise or counter-clockwise without limitation.

Figure 13:
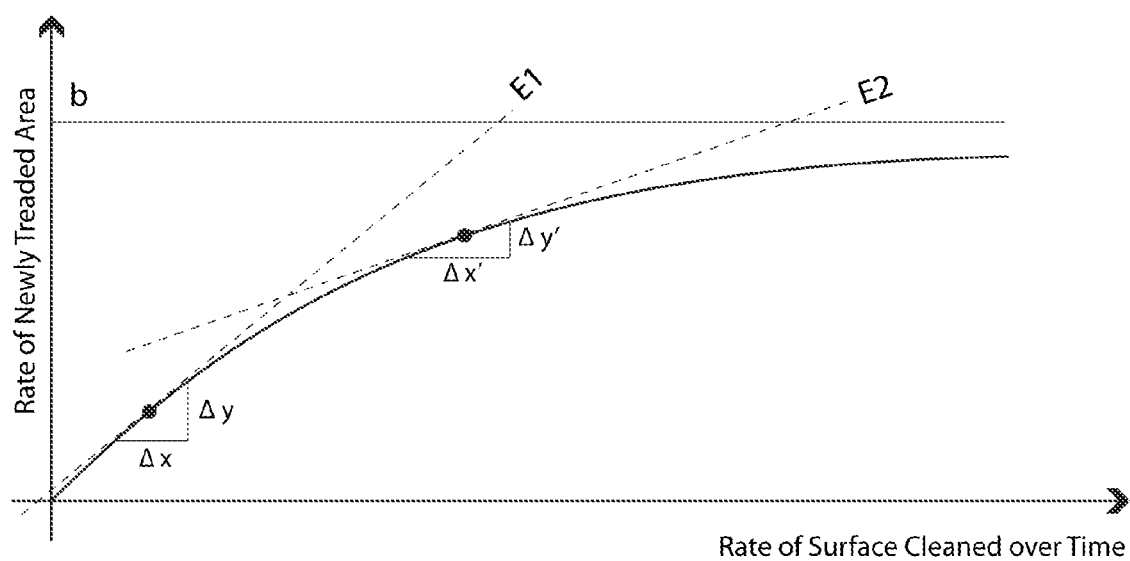
FIG. 13 is an illustrative representation of a graph of the efficiency of a random coverage method.

FIG. 13 is an illustrative representation of the efficiency of a random coverage method in an ideal workspace to illustrate and compare the efficiency of different cleaning methods versus time. In a random coverage method, Coverage (y-axis) vs. Time (x-axis), E (t), efficiency, soars at the start of the job, but as time increases, the rate of newly treaded area drops because the robotic device will visit already cleaned areas more often. Thus, efficiency drops drastically over time. As shown in the diagram, and represented by the equations below, the working area will approach being completely cleaned only when time approaches infinity. Robotic devices that use this method would require infinite time to cover 100% of the reachable area of the workspace.

$$\text{Efficiency} = \frac{\text{Rate of Newly Treaded Area}}{\text{Rate of Surface Cleaned over Time}}$$

$$\text{Efficiency}_{an\ instant} = \frac{\text{Efficiency}}{dT} = \frac{\frac{\text{Rate of Newly Treaded Area}}{dT}}{\frac{\text{Rate of Surface Cleaned over Time}}{dT}}$$

$$\lim_{t \to 0} E(t) = 1$$

$$\lim_{t \to \infty} E(t) = 0$$

Figure 14:
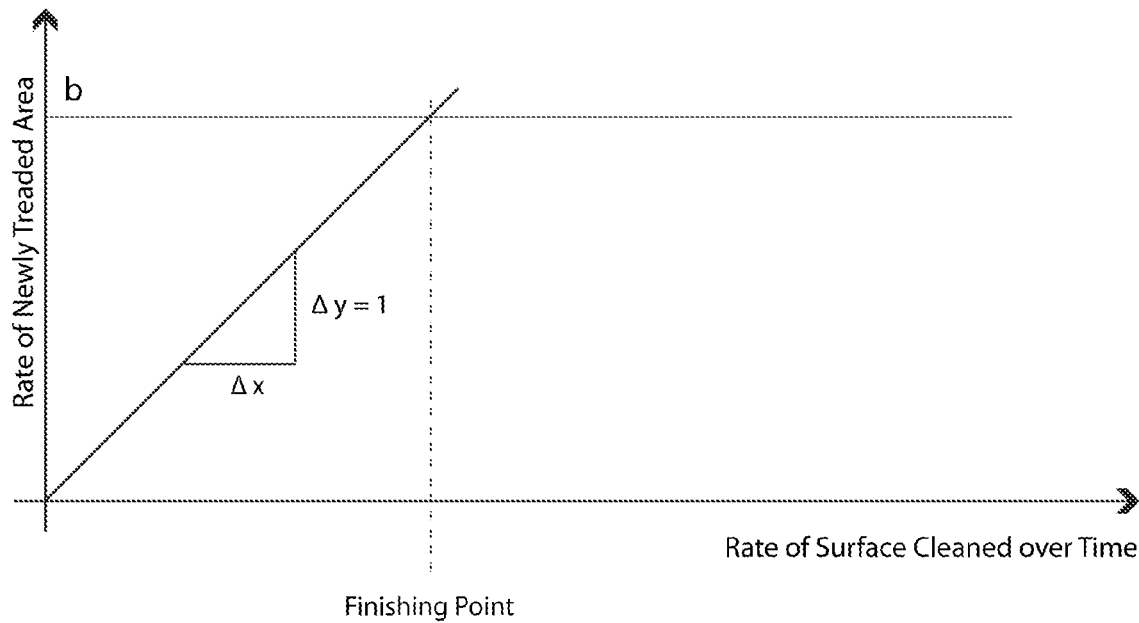
FIG. 14 is an illustrative representation of a graph of the coverage rate over time of the triangle cleaning pattern embodying features of the present invention.

FIG. 14 is an illustrative representation of the coverage rate over time of the triangle cleaning pattern embodying features of the present invention. In particular, FIG. 14 shows Coverage (y-axis) vs. Time (x-axis) of Triangle path mode in an ideal environment. In this method, from a purely mathematical perspective, the rate of newly treaded area is always equal to the coverage rate, so Coverage vs. Time is 1 at all times. The cleaning process of the robotic device has no redundancy since it only visits and cleans areas that it had not already cleaned. Using this cleaning algorithm, the job will be completed within a finite time.

Figure 15:
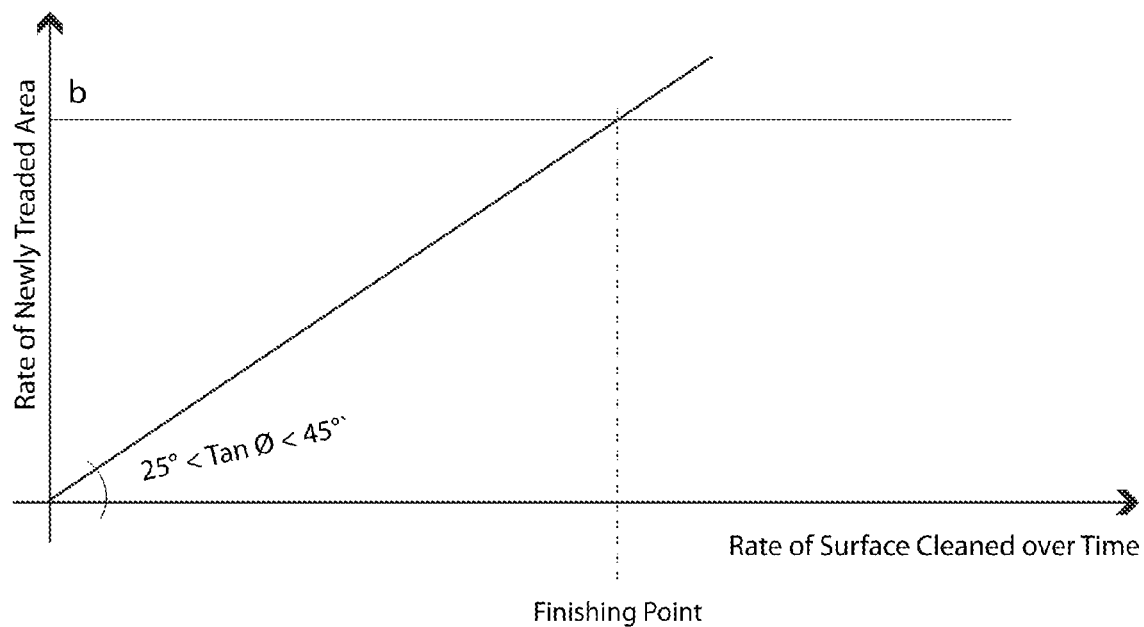
FIG. 15 is an illustrative representation of a graph of the coverage rate over time of the daisy path mode pattern embodying features of the present invention.

FIG. 15 is an illustrative representation of a graph of the coverage rate over time of the daisy path mode pattern embodying features of the present invention. In particular, FIG. 15 shows, and as represented by the equations tan 250<E(t)<tan 450 and ½<E(t)<1, Coverage (y-axis) vs. Time (x-axis) of daisy path mode. Under ideal circumstances, the coverage vs. time is a variable between ½ and 1, where 1 is no redundancy. This method cleans and covers the whole area completely within a finite amount of time.

Figure 16:
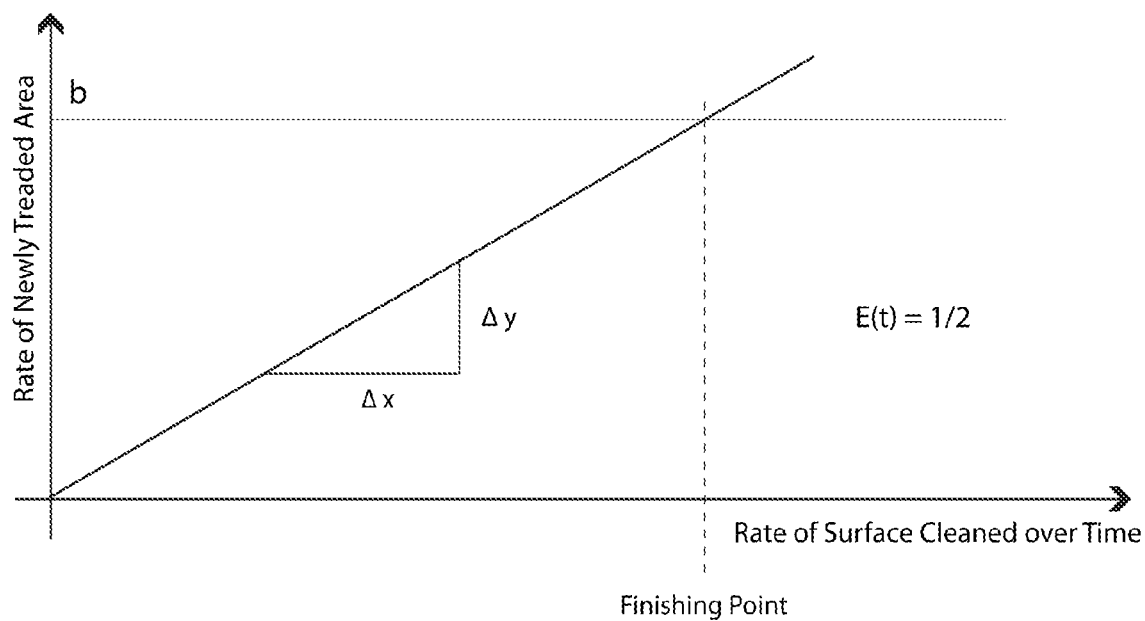
FIG. 16 is an illustrative representation of a graph of the coverage rate over time of the asterisk cleaning pattern embodying features of the present invention.

FIG. 16 is an illustrative representation of a graph of the coverage rate over time of the asterisk cleaning pattern embodying features of the present invention. In particular, FIG. 16 shows Coverage (y-axis) vs. Time (x-axis) of asterisk cleaning mode. This mode has a steady efficiency rate, E(t), of ½, in an ideal workspace and the robotic device attends all of the workspace within a finite time.

Figure 17:
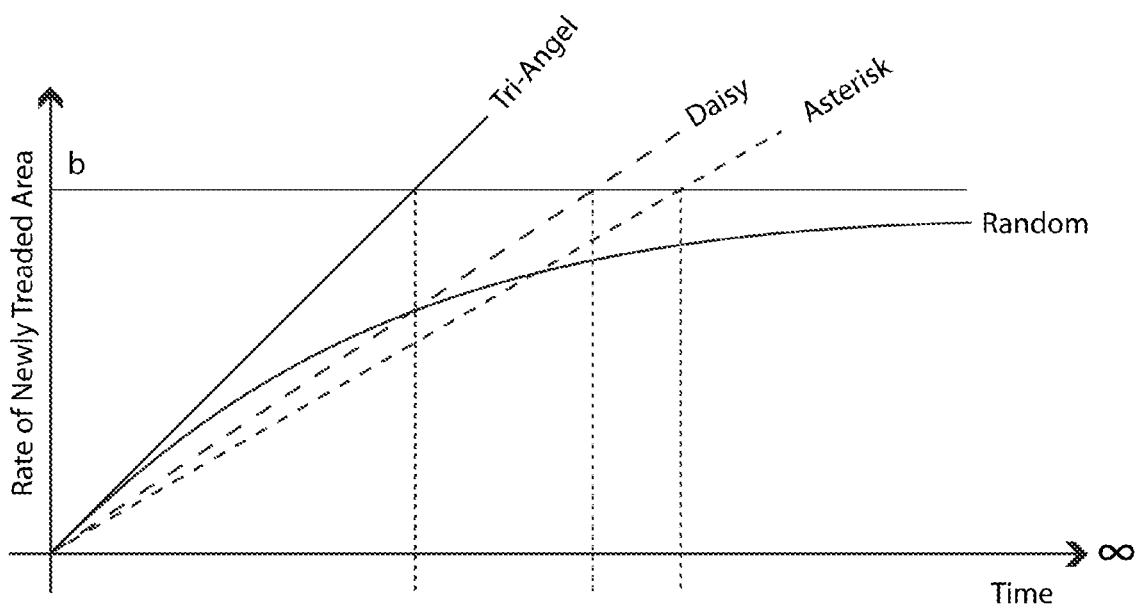
FIG. 17 is an illustrative representation of a graph comparing the coverage rate over time of a random pattern coverage method with coverage rates over time of the different cleaning modes introduced and a random coverage method embodying features of the present invention.

FIG. 17 is an illustrative representation of a graph comparing the coverage rate over time of the different cleaning modes embodying features of the present invention and a random coverage method. As illustrated, triangle path mode is the most efficient and random is the least efficient mode. As shown in the graph, the cleaning and coverage methods of embodiments disclosed herein, even using its last-resort cleaning method, have higher efficiency rates than random coverage methods conventionally utilized.

Figure 18:
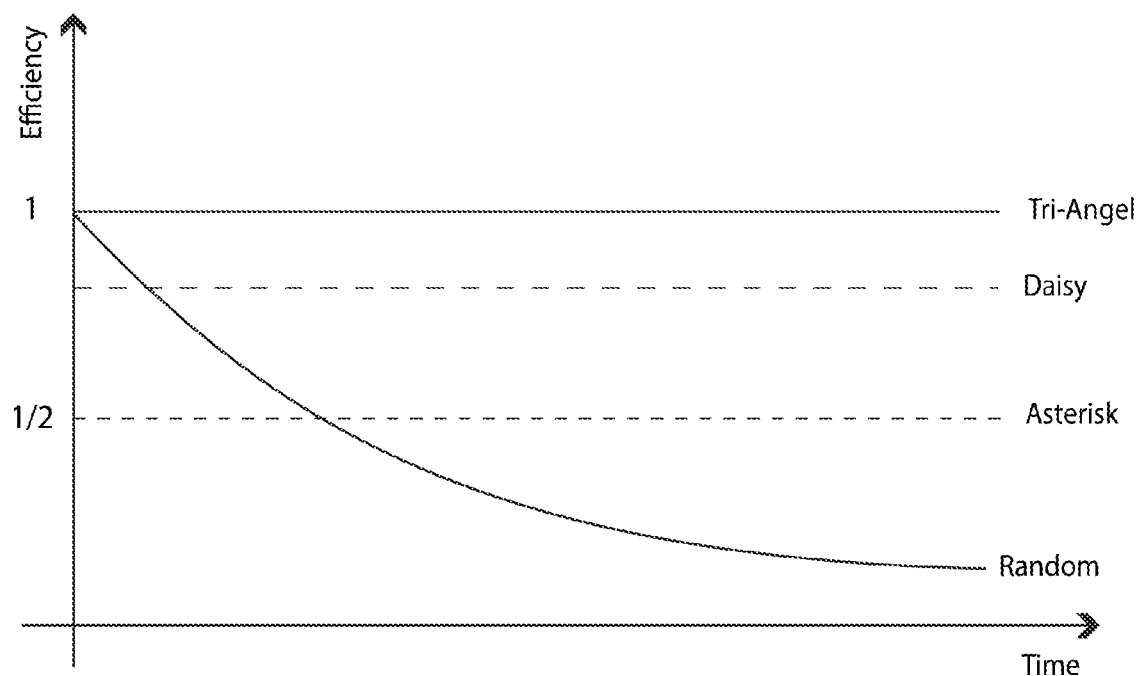
FIG. 18 is an illustrative representation of a graph comparing the efficiency over time of a random pattern coverage method with efficiency over time of the different cleaning modes introduced and embodying features of the present invention.

FIG. 18 is an illustrative representation of a graph comparing the efficiency over time of the different cleaning modes embodying features of the present invention and a random coverage method. In particular, FIG. 18 illustrates Efficiency (y-axis) vs. Time (x-axis) of the different cleaning algorithms. As illustrated, triangle, daisy and asterisk path modes have constant efficiency rates, while a random coverage algorithm's efficiency drops dramatically as time increases.

FIG. 19, as referenced earlier in connection with FIG. 3 is an illustrative representation of a table utilized to determine turning angles in the triangle cleaning pattern embodying features of the present invention. Methods may utilize the table illustrated herein to determine a maximum number of degrees a robotic device with a brush length between 9.5 inches and 10 inches can turn for a second side of a triangle based on a first measured distance without leaving any area between the two sides uncovered by the brush.

Figure 20:
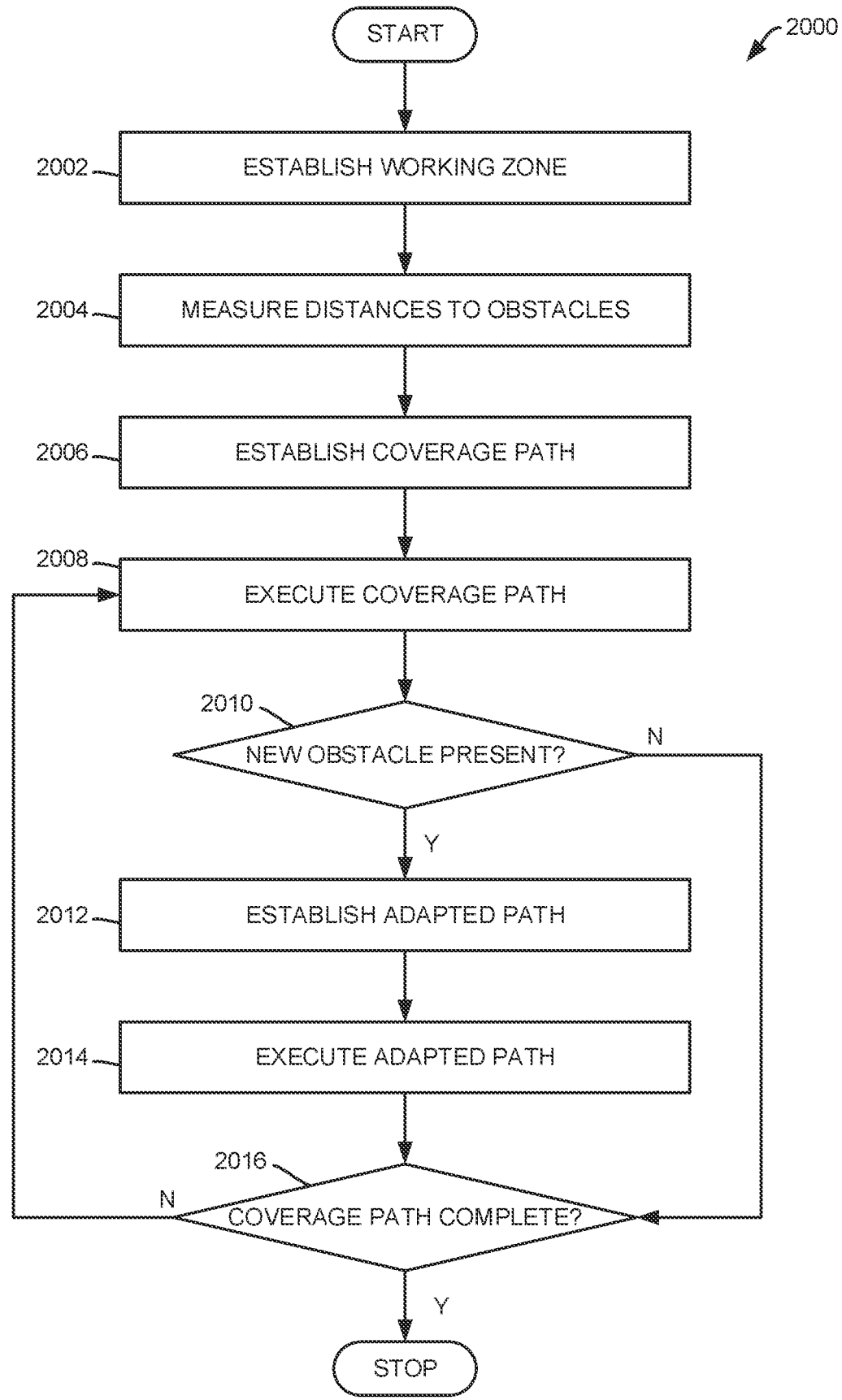
FIG. 20 is an illustrative flowchart of methods embodying features of the present invention.

FIG. 20 is an illustrative flowchart 2000 of methods embodying features of the present invention. In particular, flowchart 2000 illustrates methods for automated robotic movement for a robotic device. At a first step 2002, the method establishes a working zone. As noted above, methods provided herein divide a workspace into smaller virtual sections, referred to as "zones" or "working zones" in order to achieve better coverage management and cleaning efficiency. Before starting work in a location, methods establish a working zone. In order to establish appropriately-sized working zones within any size workspace, a series of minimum or maximum accepted distances may be determined and used during the working zone creation process. Methods for establishing a working zone will be discussed in further detail below for FIG. 21. At a next step 2004, the method measures distances to obstacles in 360 degrees around the center point of the zone in order to select the appropriate cleaning movement pattern to service the area to account for all detected obstacles.

At a next step 2006, the method establishes or selects a coverage path for the working zone based on measured distances to detected obstacles. Embodiments provided herein may utilize in any combination any of five center-return path movement patterns—namely a triangle path mode, a daisy path mode, an asterisk path mode, a closest obstacle path mode, and a farthest obstacle path mode—to form a comprehensive method for covering a workspace. In establishing a coverage path, methods may calculate any of a number of center-return paths. For example, methods may calculate a first center-return path, where the first center-return path is defined by a plurality of substantially collision-free triangulated paths, and wherein the first center-return path corresponds with a maximum turning angle, a triangle measured size with respect to the tool size of the robotic device and all distances to all detected obstacles. Further, methods may calculate a second center-return path, where the second center-return path s defined by a plurality of substantially collision-free isosceles triangulated paths, and wherein the second center-return path corresponds with a maximum turning angle, an isosceles triangle measured size with respect to the tool size of the robotic device and the distance to a first detected obstacle. Still further, methods may calculate a third center-return path, where the third center-return path is defined by a plurality of substantially collision-free point-to-point paths, and wherein the third center-return path corresponds with a maximum turning angle and a plurality of straight lines each having a measured size with respect to detected obstacles. In embodiments, when more than a predefined number of obstacles are detected within predefined minimum distance and which are a preset number of degrees apart from one another, methods may calculate a fourth center-return path, where the fourth center-return path is defined by any number of substantially collision-free point-to-point paths, and where the fourth center-return path corresponds with a plurality of straight lines each having a measured size with respect to the detected obstacles and the tool size of the robotic device, and where executing the coverage path proceeds from a shortest to a longest of the plurality of straight lines. Further, methods may calculate a fifth center-return path, where the fifth center-return path is defined by a plurality of substantially collision-free point-to-point paths, and where the fifth center-return path corresponds with a maximum turning angle and a plurality of straight lines each having a measured size with respect to the detected obstacles, and where executing the coverage path proceeds from a longest to a shortest of the plurality of straight lines.

At a next step 2008, the method executes the coverage path. It may occur that while the coverage path is being executed, a new obstacle may be presented. That is, some obstacle may appear in the coverage path while the robotic device is executing the coverage path. As such, at a step 2010, the method determines whether a new obstacle is present. If the method determines that a new obstacle is not present at a step 2010, the method continues to a step 2016.

If the method determines that a new obstacle is present at a step 2010, the method continues to a step 2012 to establish an adapted path to accommodate the new obstacle. In establishing an adapted path, methods may calculate any of a number of center-return paths for accommodating the new obstacle. For example, methods may calculate a first center-return path, where the first center-return path is defined by any number of substantially collision-free triangulated paths, and where the first center-return path corresponds with a maximum turning angle, a triangle measured size with respect to detected obstacles, and a tool size of the robotic device. Further, methods may calculate a second center-return path, where the second center-return path is defined by any number of substantially collision-free isosceles triangulated paths, and where the second center-return path corresponds with a maximum turning angle, an isosceles triangle measured size with respect to a first newly detected obstacle, and the tool size of the robotic device. Still further, methods may calculate a third center-return path, where the third center-return path is defined by any number of substantially collision-free point-to-point paths, and where the third center-return path corresponds with a maximum turning angle and a plurality of straight lines each having a measured size with respect to detected obstacles. In some embodiments, detecting a new obstacle causes an error to be logged, where when a first pre-determined number of errors are logged, switching from calculating the first center-return path to calculating the second center-return path, and where when a second pre-determined number of errors are logged, switching from calculating the second center-return path to calculating the third center-return path.

At a next step 2014, the method executes the adapted path. In executing the adapted path, the method may execute any of the following movements: moving the robotic device to the center of the working zone by retracing the coverage path before executing the adapted coverage path; moving the robotic device directly to the center of the working zone from the current location before executing the adapted coverage path; moving the robotic device directly to the third side of a triangular path from the current location before executing the adapted coverage path; and turning the robotic device a pre-set number of degrees, calculating a new triangular path until an unobstructed path is found, before executing the adapted coverage path. In this manner, a new obstacle may be bypassed whereupon the method returns to the coverage path. In some embodiments, a new obstacle must be bypassed within a specified time constraint. If, in that example, the new obstacle is not bypassed, the method may return to the coverage path or to a new workspace.

The method continues to a step 2016 to determine whether a coverage path is complete. If the method determines at a step 2016 that the coverage path is not complete, the method continues to a step 2008 to execute the coverage path. If the method determines at a step 2016 that the coverage path is complete, the method ends.

Figure 21:
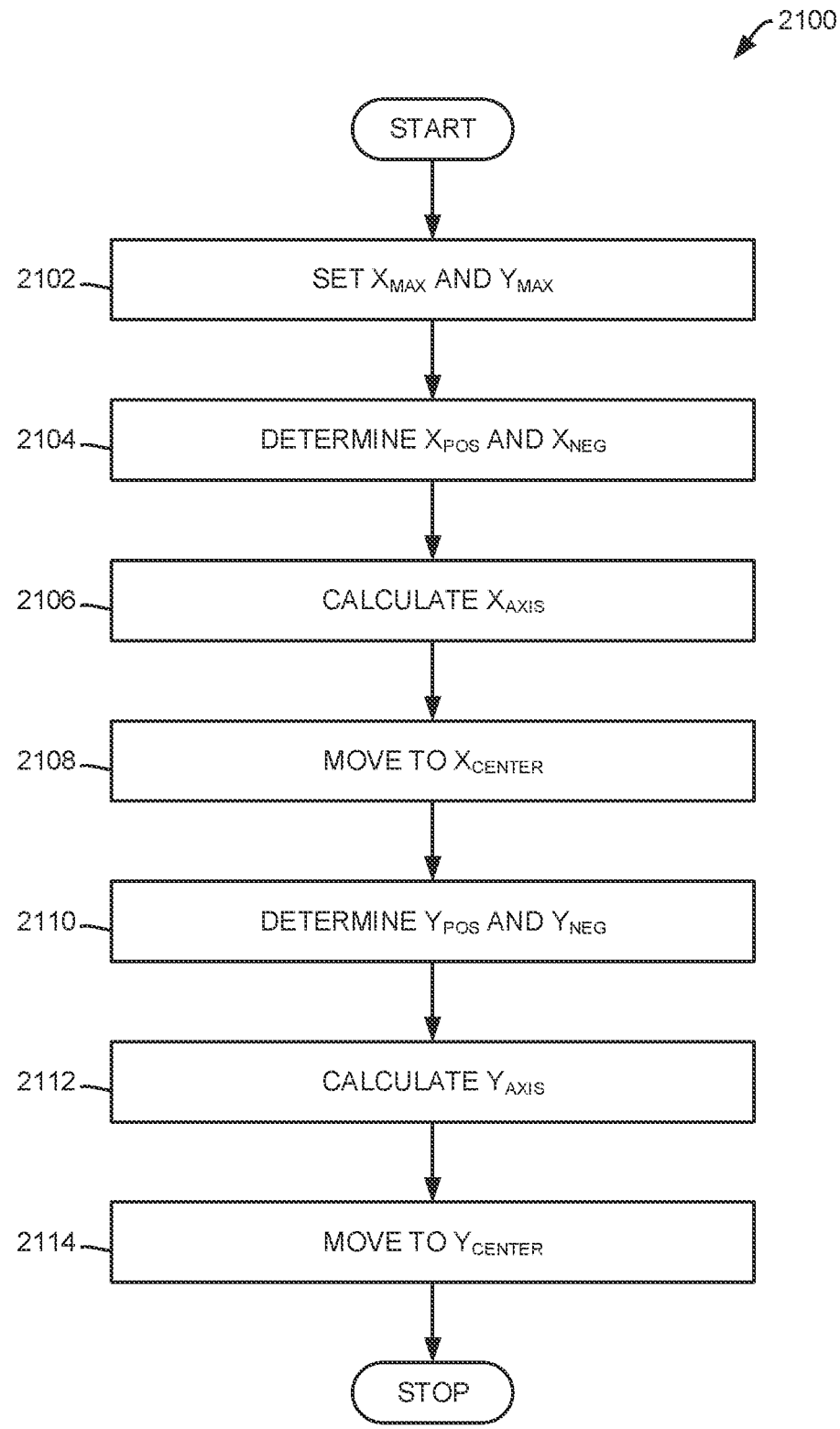
FIG. 21 is an illustrative flowchart of methods embodying features of the present invention.

FIG. 21 is an illustrative flowchart 2100 of methods embodying features of the present invention. In particular, flowchart 2100 further illustrates a step 2002 of FIG. 20. At a first step 2102, the method establishes or sets $X_{max}$ and $Y_{max}$, where the $X_{max}$ corresponds with a maximum X distance in the X direction of the working zone and where the $Y_{max}$ corresponds with a maximum Y distance in the Y direction of the working zone. At a next step 2104, the method determines an $X_{pos}$ and an $X_{neg}$, where $X_{pos}$ corresponds with a first distance to a first nearest object in a first X direction, and where $X_{neg}$ corresponds with a second distance to a second nearest object in a second X direction. At a next step 2106, the method calculates an $X_{axis}$, where $X_{axis}$ corresponds either with $X_{max}$ or with a distance defined by $X_{pos}$ and $X_{neg}$, whereupon the method continues to a step 2108 to move the robotic device to $X_{center}$, where $X_{center}$ corresponds with a midpoint of $X_{axis}$. In this manner, an X boundary in an X direction of the working zone is established and the robotic device is moved to the center of the X boundary.

At a next step 2110, the method determines an $Y_{pos}$ and an $Y_{neg}$, where $Y_{pos}$ corresponds with a first distance to a first nearest object in a first Y direction, and where $Y_{neg}$ corresponds with a second distance to a second nearest object in a second Y direction. The method continues to a step 2112 to calculate an $Y_{axis}$, where $Y_{axis}$ corresponds either with $Y_{max}$ or with a distance defined by $Y_{pos}$ and $Y_{neg}$, whereupon the method continues to a step 2114 to move the robotic device to $Y_{center}$, where $Y_{center}$ corresponds with a midpoint of $Y_{axis}$. In this manner, a Y boundary in a Y direction of the working zone is established and the robotic device is moved to the center of the Y boundary. The method then ends.

In some embodiments, it may be desirable to move the robotic device to a new area for any number of reasons. For example, when a potential axis for a working zone is detected to be less than a pre-determined minimum length, the robotic device may be moved to an axis on a different boundary of the last working zone from where zone creation can begin anew. This may be desirable because a working zone that is too small may indicate that too many obstacles are present to effectively cover an area or that obstacles in an area are too close together for the device to effectively service the area.

Figure 22:
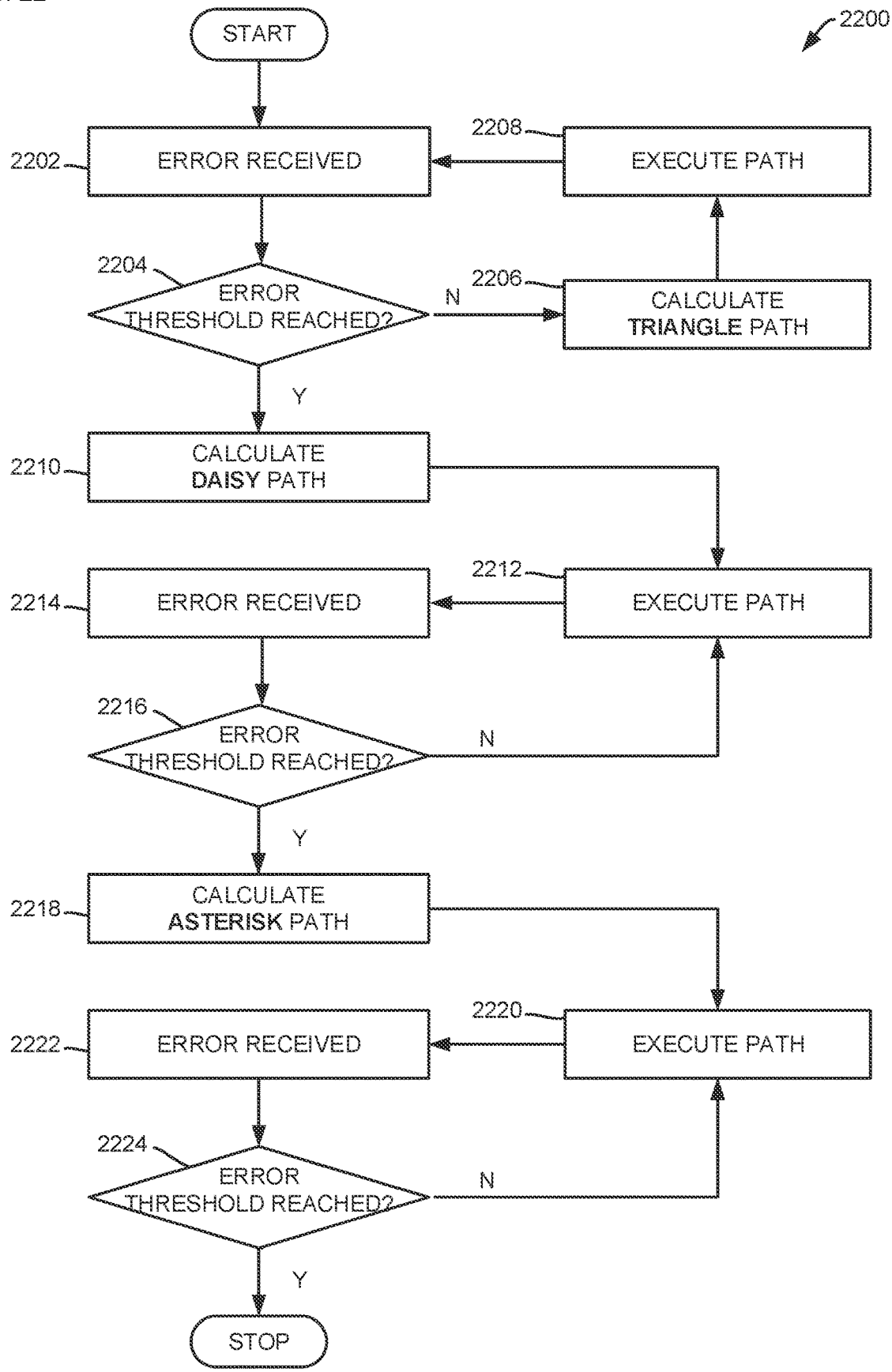
FIG. 22 is an illustrative flowchart of methods embodying features of the present invention.

FIG. 22 is an illustrative flowchart 2200 of methods embodying features of the present invention. As noted above for FIG. 20, detecting a new obstacle may cause an error to be logged, where when a first pre-determined number of errors are logged, switching from calculating the first center-return path to calculating the second center-return path, and where when a second pre-determined number of errors are logged, switching from calculating the second center-return path to calculating the third center-return path. As such, at a first step 2202 an error may be received. Errors may be received for a variety of reasons such as, for example, detecting a new obstacle or detecting a threshold number of obstacles. The method continues to a step 2204 to determine whether an error threshold has been reached. If the method determines at a step 2204 that an error threshold has not been reached, the method continues to a step 2206 to calculate a triangle path, whereupon the method continues to a step 2208 to execute the path. If the method determines at a step 2204 that an error threshold has been reached, the method continues to a step 2210 to calculate a daisy path. At a next step 2212, the method executes the path. At a step 2214, the method receives an error. Errors may be received for a variety of reasons such as, for example, detecting a new obstacle or detecting a threshold number of obstacles. The method continues to a step 2216 to determine whether an error threshold has been reached. If the method determines at a step 2216 that an error threshold has not been reached, the method continues to a step 2212 to execute the path. If the method determines at a step 2216 that an error threshold has been reached, the method continues to a step 2218 to calculate an asterisk path. At a next step 2220, the method executes the path. At a step 2222, the method receives an error. Errors may be received for a variety of reasons such as, for example, detecting a new obstacle or detecting a threshold number of obstacles. The method continues to a step 2224 to determine whether an error threshold has been reached. If the method determines at a step 2224 that an error threshold has not been reached, the method continues to a step 2220 to execute the path. If the method determines at a step 2224 that an error threshold has been reached, the method ends.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods, computer program products, and robotic devices of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

The invention claimed is:

1. A method for determining a coverage path of a robotic device, comprising:
    capturing, with a sensor disposed on the robotic device, spatial data of an environment of the robotic device;
    detecting, with a processor of the robotic device, at least one obstacle within the environment based on the spatial data;
    determining, with the processor, a first working zone within the environment;
    determining, with the processor, a coverage path within the first working zone that accounts for at least one of the obstacles detected within the first working zone, wherein:
adjacent lines of the coverage path are separated by a maximum distance of a width of a brush of the robotic device;
a distance between the adjacent lines of the coverage path are determined based on at least a desired amount of overlap in coverage by the robotic device;
a direction in which the robotic device drives alternates between adjacent lines of the coverage path;
the robotic device rotates upon reaching a terminal end of a first line of the coverage path and before driving along an adjacent second line of the coverage path in an opposite direction to a direction driven along the first line;
a degree of the rotation is determined based on at least the width of the brush of the robotic device and the desired amount of overlap in coverage by the robotic device; and
lengths of the adjacent lines are determined based on at least locations of obstacles within the environment;
actuating, with the processor, a robotic device to drive along the coverage path within the first working zone, wherein:
the processor determines an adapted coverage path when a new obstacle is detected; and
the processor actuates the robotic device to drive along the adapted coverage path; and
recording, with the processor, locations of the environment covered by the robotic device during execution of the coverage path.

2. The method of claim 1, wherein the adapted coverage path bypasses the new obstacle and the robotic device continues on the coverage path.

3. The method of claim 1, further comprising:
determining, with the processor, a second working zone within the environment;
determining, with the processor, a second coverage path within the second working zone that accounts for at least one obstacle detected within the second working zone; and
actuating, with the processor, the robotic device to drive along the second coverage path within the second working zone.

4. The method of claim 1, wherein determining the first working zone comprises:
determining, with the processor, x-boundaries and y-boundaries of the first working zone based on the spatial data, wherein connecting the x-boundaries and the y-boundaries forms a quadrilateral.

5. The method of claim 4, wherein the robotic device moves to a new location for determining the first working zone when at least one of the x-boundaries or y-boundaries is less than a predetermined length.

6. The method of claim 1, further comprising:
dividing, with the processor, the environment into zones, wherein a user determines at least one of a minimum possible zone size and a maximum possible zone size of the zones.

7. The method of claim 1, wherein:
the coverage path within the first working zone only covers a portion of the first working zone;
the processor determines at least one additional coverage path within the first working zone; and
the collection of the coverage paths within the first working zone provide full coverage of the first working zone by the robotic device.

8. The method of claim 1, further comprising:
detecting, with the processor, a number of obstacles encountered by the robotic device while executing the coverage path; and
actuating, with the processor, the robotic device to execute a new coverage path when the number of obstacles encountered within a specified amount of time or a specified distance travelled by the robotic device exceeds a predetermined number.

9. The method of claim 8, further comprising:
actuating, with the processor, the robotic device to revert to executing the coverage path when the robotic device executes interruption-free coverage for a specified amount of time.

10. The method of claim 8, wherein the number of obstacles encountered by the robotic device resets to zero upon entering a new working zone for cleaning.

11. The method of claim 1, wherein the robotic device completes work in the first working zone before creating a second working zone adjacent to the first working zone and performing work within the second working zone.

12. The method of claim 1, wherein determining the first working zone further comprises:
determining, with the processor, distances to obstacles from a first location of the robotic device based on the spatial data;
actuating, with the processor, the robotic device to move to a new location when the distances indicate there is not enough space for a zone; and
determining, with the processor, distances to obstacles from the new location of the robotic device based on the spatial data.

13. The method of claim 1, wherein determining the first working zone further comprises:
determining, with the processor, distances to obstacles from a first location of the robotic device based on the spatial data;
actuating, with the processor, the robotic device to move to a new location when the distances indicate there are too many obstacles for a zone; and
determining, with the processor, distances to obstacles from the new location of the robotic device based on the spatial data.

14. The method of claim 1, further comprising:
detecting, with the processor, the robotic device is in a confined obstacle-filled space; and
actuating, with the processor, the robotic device to execute a new coverage path adapted for cleaning obstacle-filled spaces.

15. The method of claim 1, wherein the coverage path cleans a most amount of space possible within a specified amount of time and ignores small confined obstacle-filled spaces.

16. The method of claim 1, further comprising:
actuating, with the processor, the robotic device to execute a new coverage path when the robotic device encounters a same obstacle for a predetermined amount of time.

17. The method of claim 1, wherein at least two of:
the first working zone is a room;
the first working zone is at least a predetermined minimum size; and
the first working zone is a largest possible zone without any obstacles.

18. The method of claim 1, wherein the processor selects a coverage mode of the coverage path based on a number and a position of obstacles observed within the environment.

19. A robotic device, comprising:
a chassis;
a set of wheels coupled to the chassis;
at least one electric motor for rotating the set of wheels;
at least one tool for performing work coupled to the chassis;
a processor electronically coupled to a plurality of sensors; and
a tangible, non-transitory, machine readable medium storing instructions that when executed by the processor effectuates operations comprising:
  capturing, with a sensor disposed on the robotic device, spatial data of an environment of the robotic device;
  detecting, with the processor, at least one obstacle within the environment based on the spatial data;
  determining, with the processor, a first working zone within the environment;
  determining, with the processor, a coverage path within the first working zone that accounts for at least one of the obstacles detected within the first working zone, wherein:
    adjacent lines of the coverage path are separated by a maximum distance of a width of the tool of the robotic device;
    a distance between the adjacent lines of the coverage path are determined based on at least a desired amount of overlap in coverage by the robotic device;
    a direction in which the robotic device drives alternates between adjacent lines of the coverage path;
    the robotic device rotates upon reaching a terminal end of a first line of the coverage path and before driving along an adjacent second line of the coverage path;
    a degree of the rotation is determined based on at least the width of the tool of the robotic device and the desired amount of overlap in coverage by the robotic device; and
    lengths of the adjacent lines are determined based on at least locations of obstacles within the environment;
  actuating, with the processor, a robotic device to drive along the coverage path within the first working zone, wherein:
    the processor determines an adapted coverage path when a new obstacle is detected; and
    the processor actuates the robotic device to drive along the adapted coverage path; and
  recording, with the processor, locations of the environment covered by the robotic device.

20. A tangible, non-transitory, machine readable medium storing instructions that when executed by a processor of a robotic device effectuates operations comprising:
  capturing, with a sensor disposed on the robotic device, spatial data of an environment of the robotic device;
  detecting, with the processor, at least one obstacle within the environment based on the spatial data;
  determining, with the processor, a first working zone within the environment;
  determining, with the processor, a coverage path within the first working zone that accounts for at least one of the obstacles detected within the first working zone, wherein:
    adjacent lines of the coverage path are separated by a maximum distance of a width of the tool of the robotic device;
    a distance between the adjacent lines of the coverage path are determined based on at least a desired amount of overlap in coverage by the robotic device;
    a direction in which the robotic device drives alternates between adjacent lines of the coverage path;
    the robotic device rotates upon reaching a terminal end of a first line of the coverage path and before driving along an adjacent second line of the coverage path;
    a degree of the rotation is determined based on at least the width of the tool of the robotic device and the desired amount of overlap in coverage by the robotic device; and
    lengths of the adjacent lines are determined based on at least locations of obstacles within the environment;
  actuating, with the processor, a robotic device to drive along the coverage path within the first working zone, wherein:
    the processor determines an adapted coverage path when a new obstacle is detected; and
    the processor actuates the robotic device to drive along the adapted coverage path; and
  recording, with the processor, locations of the environment covered by the robotic device.

* * * * *